US012785837B2

(12) United States Patent
Sun et al.

(10) Patent No.: US 12,785,837 B2

(45) Date of Patent: Nov. 3, 2026

(54) COMMUNICATION METHOD FOR WIRELESS LOCAL AREA NETWORK (WLAN) SYSTEM AND APPARATUS

(71) Applicant: HUAWEI TECHNOLOGIES CO., LTD., Shenzhen (CN)

(72) Inventors: Baoyu Sun, Shenzhen (CN); Yongli Yan, Shenzhen (CN); Wei Ruan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 277 days.

(21) Appl. No.: 18/623,763

(22) Filed: Apr. 1, 2024

(65) Prior Publication Data

US 2024/0259124 A1 Aug. 1, 2024

Related U.S. Application Data

(63) Continuation of application No. PCT/CN2021/122476, filed on Sep. 30, 2021.

(51) Int. Cl.

| | |
|---|---|
| ***H04J 3/06*** | (2006.01) |
| ***H04L 1/00*** | (2006.01) |
| ***H04W 84/12*** | (2009.01) |

(52) U.S. Cl.

CPC .......... *H04J 3/0605* (2013.01); *H04L 1/0003* (2013.01); *H04W 84/12* (2013.01)

(58) Field of Classification Search

CPC ..... H04J 3/0605; H04J 13/102; H04L 1/0003; H04L 1/0025; H04L 5/0026;

(Continued)

(56) References Cited

U.S. PATENT DOCUMENTS

| | | | | |
|---|---|---|---|---|
| 2016/0269930 | A1* | 9/2016 | Huang .................. | H04W 8/005 |
| 2019/0372816 | A1 | 12/2019 | Si et al. | |
| 2021/0007006 | A1 | 1/2021 | Chen et al. | |

FOREIGN PATENT DOCUMENTS

| | | | |
|---|---|---|---|
| CN | 101379788 | A | 3/2009 |
| CN | 106209159 | A | 12/2016 |

OTHER PUBLICATIONS

LAN/MAN Standards Committee of the IEEE Computer Society, "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band", Institute of the Electrical and Electronics Engineers, Piscataway, New Jersey, USA, IEEE Std 802.11g/D1.0, Total 66 pages, (Nov. 2001).

(Continued)

*Primary Examiner* — Diane D Mizrahi

(74) *Attorney, Agent, or Firm* — Leydig, Voit & Mayer, Ltd.

(57) ABSTRACT

A communication method for a wireless fidelity Wi-Fi system and an apparatus are provided that relate to the field of communication technologies. The method and system improve an anti-interference capability of an internet of things (IoT) device and improve a coverage capability and a wall penetration capability. The communication method for the wireless fidelity Wi-Fi system includes: generating a Wi-Fi frame including a preamble, where a synchronization sequence of the preamble includes at least one extension code, and the extension code includes N symbols generated based on a Barker code, where N=α*M, M is a chip length of the Barker code, and α is a positive integer; and transmitting the Wi-Fi frame.

20 Claims, 12 Drawing Sheets

(58) Field of Classification Search
CPC ... H04L 5/0048; H04L 1/0031; H04L 1/0067; H04L 1/0075; H04L 27/2602; H04L 27/26132; H04L 27/26134; H04L 27/2634; H04W 84/12; H04B 1/7073
See application file for complete search history.

(56) References Cited

OTHER PUBLICATIONS

"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-speed Physical Layer Extension in the 2.4 GHz band," IEEE Std 802.11b—1999, Nov. 2001, Total 97 pages (Sep. 1999).
"Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHZ Band," IEEE Std 802.11a—1999, Total 90 pages (Sep. 1999).
"IEEE Standard for Information technology—Telecommunications and information exchange between systems—Local and metropolitan area networks—Specific requirements—Part 11: Wireless LAN Medium Access Control (MAC) and Physical Layer (PHY) specifications, Amendment 4: Further Higher Data Rate Extension in the 2.4 GHz Band," IEEE Std 802.11g™—2003, Total 78 pages (Jun. 2003).
"IEEE Standard for Information technology—Telecommunications and information exchange between systems—Local and metropolitan area networks—Specific requirements—Part 11: Wireless LAN Medium Access Control (MAC) and Physical Layer (PHY) specifications, Amendment 5: Enhancements for Higher Throughput," IEEE Std 802.11n™—2009, Total 536 pages (Oct. 2009).
"IEEE Std 802.11ac™—2013, Part 11: Wireless LAN Medium Access Control (MAC) and Physical Layer (PHY) Specifications, Amendment 4: Enhancements for Very High Throughput for Operation in Bands below 6 GHz," IEEE Computer Society, Total 425 pages (Dec. 2013).
"IEEE P802.11ax™/D6.0, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," IEEE Computer Society, Total 780 pages (Nov. 2019).
"IEEE Standard for Information technology—Telecommunications and information exchange between systems, Local and metropolitan area networks—Specific requirements, Part 11: Wireless LAN Medium Access Control (MAC) and Physical Layer (PHY) Specifications," IEEE Std 802.11—2016, Total 3534 pages (Dec. 2016).

* cited by examiner

COMMUNICATION METHOD FOR WIRELESS LOCAL AREA NETWORK (WLAN) SYSTEM AND APPARATUS

CROSS-REFERENCE TO RELATED APPLICATIONS

This application is a continuation of International Application No. PCT/CN2021/122476, filed on Sep. 30, 2021, the disclosure of which is hereby incorporated by reference in its entirety.

TECHNICAL FIELD

The present disclosure relates to the field of communication technologies, and in particular, to a communication method for a wireless local area network (WLAN) system and an apparatus.

BACKGROUND

Wi-Fi® technology is a wireless local area network (WLAN) technology that is created by the Wi-Fi Alliance in the Institute of Electrical and Electronics Engineers (IEEE) 802.11 standard. Usually, two types of devices: an access point (AP) and a station (STA) are involved in WLAN technology (e.g., Wi-Fi® technology). The AP may also be referred to as a wireless access point, which is a provider of a WLAN network, allows access of another wireless device, and provides data access for the accessed device. A device that accesses the WLAN network may be referred to as a STA. For example, an electronic device such as a mobile phone, a tablet computer, or a notebook computer that supports a WLAN function may be used as a STA. User data is transmitted between the AP and the STA by using a WLAN physical frame (referred to as a WLAN frame for short). Currently, in the six generations of Wi-Fi® systems (801.11, 802.11b, 802.11a/g, 802.11n, 802.11ac, and 802.11ax) that have been developed and popularized, communication quality and a communication rate are greatly improved in each generation of the IEEE 802.11 standard.

In recent years, more and more Internet of Things (IOT) devices that serve as STAs appear in a home network, and even common home appliances have an attribute of an IoT device by integrating a WLAN module. An IoT device generally has the following features: low costs, low power consumption, low traffic, and wide coverage. In Wi-Fi-based Internet of Things devices, the 802.11b standard has extremely high potential and has the foregoing features. Generally, when an AP sends a WLAN frame, a gain of a physical layer preamble (PHY preamble), also referred to as a physical layer convergence protocol (PLCP) preamble, which is referred to as a preamble for short) in the WLAN frame detected by an IoT device based on the 802.11b Wi-Fi® standard comes from a spreading gain of the AP. In the 802.11b standard, the AP uses a conventional Barker code whose chip length is 11 to spread a scrambled (after scrambling processing is performed) preamble, and a spreading gain is about 10.4 dB. However, in a complex home environment, for example, a common home user generally has only one AP, and IoT devices (smart home devices such as a refrigerator, an air conditioner, a color TV, a smart curtain, a smart camera, and a smart home) may be distributed in various locations of a home, which imposes a strict requirement on a coverage capability of each device. Especially in an ultra-low signal-to-noise ratio (SNR) scenario, because symbols of a scrambled preamble are discretely distributed, and a maximum length of coherence superposition between chips of a Barker code used for spreading is limited by a period 11, a maximum peak value of a synchronization sequence of a preamble for spreading based on the Barker code whose chip length is 11 is limited by the maximum length (11) of coherence superposition between the chips of the Barker code. Consequently, the maximum peak value of the synchronization sequence may be submerged by noise, and the peak value cannot be detected. Consequently, acquisition (ACQ) cannot be performed on the IoT device. Therefore, the spreading gain cannot meet a wide coverage requirement. As a result, an IoT device in the 802.11b standard has a weak anti-interference capability and a weak wall penetration capability, affecting user experience.

SUMMARY

Embodiments of this application provide a communication method for a wireless local area network (WLAN) system and an apparatus, to improve an anti-interference capability of an IoT device, and improve a coverage capability and a wall penetration capability.

To achieve the foregoing objectives, this application adopts the following technical solutions.

According to a first aspect, a communication method for a WLAN system is provided. The method may be performed by a first communication apparatus, the first communication apparatus may alternatively be a module or a chip in the first communication apparatus, or the first communication apparatus may be a chip or a system on chip. The method includes the following steps: first, generating a WLAN (e.g., Wi-Fi®) frame including a preamble, where a synchronization sequence of the preamble includes at least one extension code, and the extension code includes N symbols generated based on a Barker code, where $N=\alpha*M$, M is a chip length of the Barker code, and $\alpha$ is a positive integer; and then, transmitting the WLAN frame. In this application, one or more segments of an extension code provided in this embodiment of this application are mainly used to replace a synchronization sequence of a preamble of a WLAN frame. Because the extension code is generated based on a Barker code, symbols of the extension code are correlated. In this way, in a WLAN frame transmission process (e.g., a Wi-Fi® frame transmission process), after the synchronization sequence is spread by using the Barker code, chips formed by spreading different symbols included in the extension code are also correlated. Compared with the current technology (symbols in a current synchronization sequence are discrete points, and therefore, only chips formed by spreading each symbol are correlated), a longer chip length and a longer period can be correlated and superimposed, so that a higher detection peak value can be obtained, thereby improving an anti-interference capability of an IoT device, and improving a coverage capability and a wall penetration capability.

In a possible implementation, the synchronization sequence includes: a first group of extension codes, where the first group of extension codes includes a first extension code and a second extension code that is located in first duration after the first extension code; and a second group of extension codes, where the second group of extension codes includes a third extension code and a fourth extension code that is located in second duration after the third extension code; and the second group of extension codes is located after the first group of extension codes, and the first duration is not equal to the second duration. The synchronization sequence of the WLAN frame includes two groups of extension codes, and each group of extension codes has two extension codes. For example, a spreading sequence of the first group of extension codes is $C_0=[C_{ACQ0}, C_{eSFD0}]$, where a spreading sequence of the first extension code in the first group of extension codes is $C_{ACQ0}=+1\otimes c$, a spreading sequence of the second extension code in the first group of synchronization code segments is $C_{eSFD0}=-1\otimes c$, and an interval between the two sequences is the first duration $d_0$ (for $d_0$, 5 μs is recommended); and a spreading sequence of the second group of extension codes is $C_1=[C_{ACQ1}, C_{esFD1}]$, where a spreading sequence of the third extension code in the second group of extension codes is $C_{ACQ1}=+1\otimes c$, a spreading sequence of the fourth extension code in the second group of extension codes is $C_{eSFD1}=-1\otimes c$, and an interval between the two sequences is the second duration $d_1$ (for $d_1$, 7 μs is recommended). Detection is performed on $C_{ACQ0}$ and $C_{eSFD0}$ (or $C_{ACQ1}$ and $C_{eSFD1}$) sequences in the spreading sequence of each group of extension codes in the synchronization sequence, to distinguish the two groups of sequences based on whether the $C_{ACQ0}$ and $C_{eSFD0}$ (or $C_{ACQ1}$ and $C_{eSFD1}$) sequences are reverse; and whether a group of extension codes is synchronized is identified by using an interval between peak values of the $C_{ACQ0}$ and $C_{eSFD0}$ sequences, so as to determine a synchronization position based on $C_{ACQ0}$ (or $C_{ACQ1}$) and determine a frame start position based on $C_{eSFD0}$ (or $C_{eSFD1}$). In addition, $d_0 \neq d_1$, which is used to avoid periodicity of the spreading sequences of the two groups of extension codes.

In a possible implementation, a PSDU of the WLAN frame includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; before the transmitting the WLAN frame, the method further includes: performing channel coding (for example, LDPC coding or Polar coding) on the data code blocks by using the coding scheme; performing rate matching on data code blocks obtained through the channel coding; modulating data code blocks obtained through the rate matching based on the modulation scheme, where the modulation scheme includes differential modulation; and the transmitting the WLAN frame includes: spreading the modulated data code blocks and then transmitting modulated data code blocks obtained through spreading. In this way, channel coding is mainly introduced to a link of a transmitter for transmission of the payload of the WLAN frame, which is more conducive to improving transmission quality in a low SNR scenario.

In a possible implementation, before the modulating data code blocks obtained through the rate matching based on the modulation scheme, the method further includes: performing differential coding on the data code blocks obtained through the rate matching, where the modulation scheme includes non-differential modulation. When the modulation scheme includes differential modulation, a network device performs differential coding on the data code blocks obtained through the rate matching, to cooperate with the differential modulation, so as to implement an effect of non-differential modulation, so that a recipient calculates a log likelihood ratio (LLR) by using non-differential demodulation.

In a possible implementation, the extension header further includes a check bit. The check bit is used to perform data check on the extension header.

In a possible implementation, the PSDU further includes an extension start frame delimiter SFD located before the extension header. The extension start frame delimiter indicates that the extension header eheader is transmitted subsequently.

In a possible implementation, a spreading sequence c of the extension code meets the following formula: $c=s\otimes b$; and the extension code is $s=r\otimes b$, where b is the Barker code, and $r=[+1;-1]$.

In a possible implementation, the extension code is obtained from a spreading sequence generated by spreading an initial sequence based on the Barker code.

According to a second aspect, a communication method for a WLAN system is provided. The method may be performed by a second communication apparatus, the second communication apparatus may alternatively be a module or a chip in the second communication apparatus, or the second communication apparatus may be a chip or a system on chip. The method includes: receiving a WLAN frame, where a synchronization sequence of a preamble of the WLAN frame includes at least one extension code, and the extension code includes N symbols generated based on a Barker code, where $N=\alpha^*M$, M is a chip length of the Barker code, and α is a positive integer; and despreading the WLAN frame based on the Barker code, to obtain the synchronization sequence in the preamble.

In a possible implementation, the synchronization sequence includes: a first group of extension codes, where the first group of extension codes includes a first extension code and a second extension code that is located in first duration after the first extension code; and a second group of extension codes, where the second group of extension codes includes a third extension code and a fourth extension code that is located in second duration after the third extension code; and the second group of extension codes is located after the first group of extension codes, and the first duration is not equal to the second duration.

In a possible implementation, a PSDU of the WLAN frame includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; and the method further includes: despreading the data code blocks based on the Barker code; demodulating the despread data code blocks based on the modulation scheme, where the modulation scheme includes differential modulation; performing rate de-matching on the demodulated data code blocks; and performing channel decoding on data code blocks obtained through the rate de-matching based on the coding scheme.

In a possible implementation, before the performing rate de-matching on the demodulated data code blocks, the method further includes: performing de-differential decoding on the demodulated data code blocks, where the modulation scheme includes non-differential modulation.

In a possible implementation, the extension header further includes a check bit.

In a possible implementation, the PSDU further includes an extension start frame delimiter SFD located before the extension header.

In a possible implementation, a spreading sequence c of the extension code meets the following formula: $c=s\otimes b$; and the extension code is $s=r\otimes b$, where b is the Barker code, and $r=[+1;-1]$.

In a possible implementation, the extension code is obtained from a spreading sequence generated by spreading an initial sequence based on the Barker code.

According to a third aspect, a communication method for a WLAN system is provided. The method may be performed by a first communication apparatus, the first communication apparatus may alternatively be a module or a chip in the first communication apparatus, or the first communication apparatus may be a chip or a system on chip. The method includes the following steps: generating a WLAN frame including a PSDU, where the PSDU includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; performing channel coding on the data code blocks by using the coding scheme; performing rate matching on data code blocks obtained through the channel coding; modulating data code blocks obtained through the rate matching based on the modulation scheme, where the modulation scheme includes differential modulation; and transmitting modulated data code blocks obtained through spreading. In this way, channel coding is mainly introduced to a link of a transmitter for transmission of the payload of the WLAN frame, which is more conducive to improving transmission quality in a low SNR scenario.

In a possible implementation, before the modulating data code blocks obtained through the rate matching based on the modulation scheme, the method further includes: performing differential coding on the data code blocks obtained through the rate matching, where the modulation scheme includes non-differential modulation. When the modulation scheme includes differential modulation, a network device performs differential coding on the data code blocks obtained through the rate matching, to cooperate with the differential modulation, so as to implement an effect of non-differential modulation, so that a recipient calculates a log likelihood ratio LLR by using non-differential demodulation.

In a possible implementation, the extension header further includes a check bit.

In a possible implementation, the PSDU further includes an extension start frame delimiter SFD located before the extension header. The extension start frame delimiter indicates that the extension header eheader is transmitted subsequently.

According to a fourth aspect, a communication method for a WLAN system is provided. The method may be performed by a second communication apparatus, the second communication apparatus may alternatively be a module or a chip in the second communication apparatus, or the second communication apparatus may be a chip or a system on chip. The method includes: receiving a WLAN frame, where a PSDU of the WLAN frame includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; despreading the data code blocks based on a Barker code; demodulating the despread data code blocks based on the modulation scheme, where the modulation scheme includes differential modulation; performing rate de-matching on the demodulated data code blocks; and performing channel decoding on data code blocks obtained through the rate de-matching based on the coding scheme.

In a possible implementation, before the performing rate de-matching on the demodulated data code blocks, the method further includes: performing de-differential decoding on the demodulated data code blocks, where the modulation scheme includes non-differential modulation.

In a possible implementation, the extension header further includes a check bit. The check bit is used to perform data check on the extension header.

In a possible implementation, the PSDU further includes an extension start frame delimiter SFD located before the extension header.

According to a fifth aspect, a communication apparatus is provided. The communication apparatus may be a first communication apparatus, the first communication apparatus may alternatively be a module or a chip in the first communication apparatus, or the first communication apparatus may be a chip or a system on chip, and the communication apparatus includes: a processor, configured to generate a WLAN frame including a preamble, where a synchronization sequence of the preamble includes at least one extension code, and the extension code includes N symbols generated based on a Barker code, where $N=\alpha*M$, M is a chip length of the Barker code, and $\alpha$ is a positive integer; and a transmitter, configured to transmit the WLAN frame.

In a possible implementation, the synchronization sequence includes: a first group of extension codes, where the first group of extension codes includes a first extension code and a second extension code that is located in first duration after the first extension code; and a second group of extension codes, where the second group of extension codes includes a third extension code and a fourth extension code that is located in second duration after the third extension code; and the second group of extension codes is located after the first group of extension codes, and the first duration is not equal to the second duration.

In a possible implementation, a PSDU of the WLAN frame includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; the processor is further configured to: perform channel coding on the data code blocks by using the coding scheme; perform rate matching on data code blocks obtained through the channel coding; and modulate data code blocks obtained through the rate matching based on the modulation scheme, where the modulation scheme includes differential modulation; and the transmitter is configured to spread the modulated data code blocks and then transmit modulated data code blocks obtained through spreading.

In a possible implementation, the processor is further configured to perform differential coding on the modulated data code blocks, where the modulation scheme includes non-differential modulation.

In a possible implementation, the extension header further includes a check bit.

In a possible implementation, the PSDU further includes an extension start frame delimiter SFD located before the extension header.

In a possible implementation, a spreading sequence c of the extension code meets the following formula: $c=s\otimes b$; and the extension code is $s=r\otimes b$, where b is the Barker code, and $r=[+1;-1]$.

In a possible implementation, the extension code is obtained from a spreading sequence generated by spreading an initial sequence based on the Barker code.

According to a sixth aspect, a communication apparatus is provided. The communication apparatus may be a second communication apparatus, the second communication apparatus may alternatively be a module or a chip in the second communication apparatus, or the second communication apparatus may be a chip or a system on chip, and the communication apparatus includes: a receiver, configured to receive a WLAN frame; and a processor, configured to despread the WLAN frame based on a Barker code, to obtain a synchronization sequence in a preamble, where the synchronization sequence of the preamble of the WLAN frame includes at least one extension code, and the extension code includes N symbols generated based on the Barker code, where $N=\alpha*M$, M is a chip length of the Barker code, and $\alpha$ is a positive integer.

In a possible implementation, the synchronization sequence includes: a first group of extension codes, where the first group of extension codes includes a first extension code and a second extension code that is located in first duration after the first extension code; and a second group of extension codes, where the second group of extension codes includes a third extension code and a fourth extension code that is located in second duration after the third extension code; and the second group of extension codes is located after the first group of extension codes, and the first duration is not equal to the second duration.

In a possible implementation, a PSDU of the WLAN frame includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; and the processor is further configured to: despread the data code blocks based on the Barker code; demodulate the despread data code blocks based on the modulation scheme, where the modulation scheme includes differential modulation; perform rate de-matching on the demodulated data code blocks; and perform channel decoding on data code blocks obtained through the rate de-matching based on the coding scheme.

In a possible implementation, the processor is further configured to perform de-differential decoding on the despread data code blocks, where the modulation scheme includes non-differential modulation.

In a possible implementation, the extension header further includes a check bit.

In a possible implementation, the PSDU further includes an extension start frame delimiter SFD located before the extension header.

In a possible implementation, a spreading sequence c of the extension code meets the following formula: $c=s\otimes b$; and the extension code is $s=r\otimes b$, where b is the Barker code, and $r=[+1;-1]$.

In a possible implementation, the extension code is obtained from a spreading sequence generated by spreading an initial sequence based on the Barker code.

According to a seventh aspect, a communication apparatus is provided. The communication apparatus may be a first communication apparatus, the first communication apparatus may alternatively be a module or a chip in the first communication apparatus, or the first communication apparatus may be a chip or a system on chip, and the communication apparatus includes: a processor, configured to: generate a WLAN frame including a PSDU, where the PSDU includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; perform channel coding on the data code blocks by using the coding scheme; perform rate matching on data code blocks obtained through the channel coding; and modulate data code blocks obtained through the rate matching based on the modulation scheme, where the modulation scheme includes differential modulation; and a transmitter, configured to transmit the modulated data code blocks.

In a possible implementation, the processor is further configured to perform differential coding on the data code blocks obtained through the rate matching, where the modulation scheme includes non-differential modulation.

In a possible implementation, the extension header further includes a check bit.

In a possible implementation, the PSDU further includes an extension start frame delimiter SFD located before the extension header.

According to an eighth aspect, a communication apparatus is provided. The communication apparatus may be a second communication apparatus, the second communication apparatus may alternatively be a module or a chip in the second communication apparatus, or the second communication apparatus may be a chip or a system on chip, and the communication apparatus includes: a receiver, configured to receive a WLAN frame, where a PSDU of the WLAN frame includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; and a processor, configured to: despread the data code blocks based on a Barker code; demodulate the despread data code blocks based on the modulation scheme, where the modulation scheme includes differential modulation; perform rate de-matching on the demodulated data code blocks; and perform channel decoding on data code blocks obtained through the rate de-matching based on the coding scheme.

In a possible implementation, the processor is further configured to perform de-differential decoding on the demodulated data code blocks, where the modulation scheme includes non-differential modulation.

In a possible implementation, the extension header further includes a check bit.

In a possible implementation, the PSDU further includes an extension start frame delimiter SFD located before the extension header.

According to a ninth aspect, a computer-readable storage medium is provided. The computer-readable storage medium stores a computer program, and when the computer program is run on a computer, the computer is enabled to perform the method according to any one of the foregoing aspects.

According to a tenth aspect, a computer program product including instructions is provided. The computer program product includes computer program code, and when the computer program code is run on a computer, the computer is enabled to perform the method according to any one of the foregoing aspects.

According to an eleventh aspect, a communication system is provided. The communication system includes the first communication apparatus in the foregoing aspects and the second communication apparatus in the foregoing aspects. In an example, the first communication apparatus may be a network device, and the second communication apparatus may be a terminal device.

For technical effects brought by any design manner of the second aspect, refer to technical effects brought by different design manners of the first aspect. Details are not described herein again. For technical effects brought by any design manner of the fourth aspect, refer to technical effects brought by different design manners of the third aspect. Details are not described herein again. For technical effects brought by any design manner of the fifth aspect and the sixth aspect, refer to technical effects brought by different design manners of the first aspect. Details are not described herein again. For technical effects brought by any design manner of the seventh aspect and the eighth aspect, refer to technical effects brought by different design manners of the first aspect. Details are not described herein again. For technical effects brought by any design manner of the ninth aspect to the eleventh aspect, refer to technical effects brought by different design manners of the first aspect and the third aspect. Details are not described herein again.

DESCRIPTION OF EMBODIMENTS

The following describes technical solutions with reference to accompanying drawings.

All aspects, embodiments, or features are presented herein by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used. In addition, in embodiments, the term “example” or “for example” is used to represent giving an example, an illustration, or a description. Any embodiment or design scheme described as an “example” should not be explained as being more preferred or having more advantages than another embodiment or design scheme. Exactly, the term “example” is used to present a concept in a specific manner. In embodiments, “information (information)”, “signal (signal) ”, “message (message)”, “channel (channel)”, “signaling (signaling), and “message (message)” may be mixed during use sometimes. It should be noted that expressed meanings are consistent when differences are not emphasized. Terms “of (of)”, “corresponding (corresponding, relevant)” and “corresponding (corresponding)” may be mixed during use sometimes. It should be noted that expressed meanings are consistent when differences are not emphasized.

A network architecture and service scenarios described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

In addition, the terms “include”, “have”, and any other variant thereof mentioned in descriptions of this application are intended to cover non-exclusive inclusion. For example, a process, method, system, product, or device that includes a series of steps or units is not limited to the listed steps or units, but optionally further includes other steps or units that are not listed, or optionally further includes another step or unit that is inherent to the process, method, product, or device.

Figure 1:
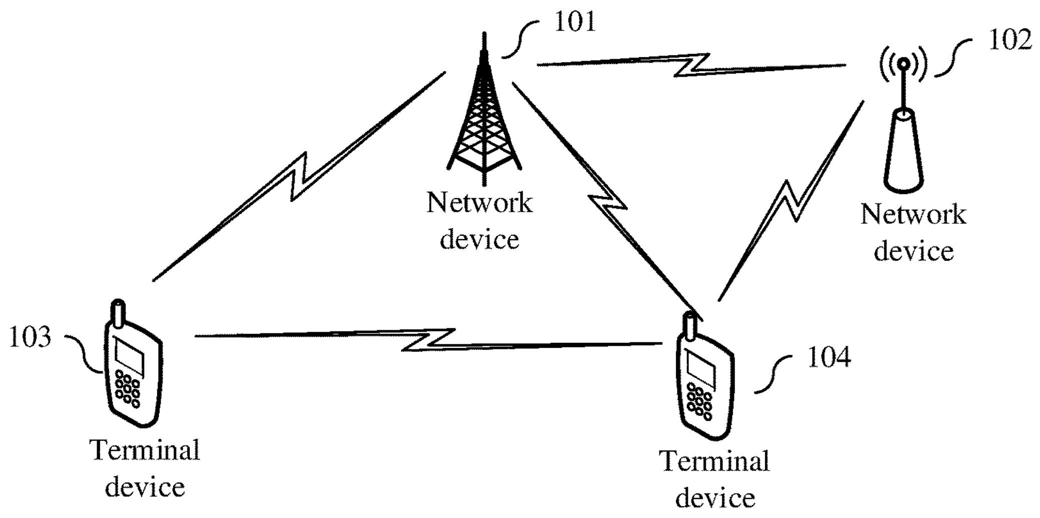
FIG. 1 is a schematic diagram of a structure of a communication system according to an embodiment.

For ease of understanding embodiments of this application, a communication system shown in FIG. 1 is first used as an example to describe in detail a communication system to which embodiments of this application are applicable. FIG. 1 is a schematic diagram of a communication system to which a communication method for a WLAN system according to an embodiment of this application is applicable. As shown in FIG. 1, the communication system includes a network device 101 and a terminal device 103, and a plurality of antennas may be configured for each of the network device 101 and the terminal device 103. Optionally, the communication system may further include another network device and/or another terminal device, for example, a network device 102 and a terminal device 104, and a plurality of antennas may also be configured for each of the network device 102 and the terminal device 104.

It should be understood that the network device and the terminal device may further include a plurality of components (for example, a processor, an encoder, a decoder, a modulator, a demodulator, a multiplexer, and a de-multiplexer) related to signal sending and receiving.

For example, the network device may be a device with a wireless transceiver function or a chip that may be disposed in the network device. The network device includes but is not limited to: an access point (AP) in a WLAN system, an evolved NodeB (eNB), a home NodeB (HNB), a wireless relay node, a wireless backhaul node, a transmission point (TP), a transmission and reception point (TRP), or the like. Alternatively, the network device may be a gNB in a new radio (NR) system, a communication server, a router, a switch, a bridge, a computer, or the like.

For example, the terminal device may also be referred to as user equipment (UE), an access terminal, a subscriber unit, a subscriber station, a mobile station, a mobile console, a remote station, a remote terminal, a mobile device, a user terminal, a wireless communication device, a user agent, a user apparatus, or the like. In embodiments of this application, the terminal device may be a non-access point station (NON-STA or STA), a mobile phone, a tablet computer (Pad), a computer with a wireless transceiver function, a virtual reality (VR) terminal, a wireless terminal in a smart city, a wireless terminal in a smart home, or the like. In embodiments of this application, the terminal device and a chip that may be disposed in the terminal device are collectively referred to as a terminal device.

In the communication system, one network device or one terminal device may be regarded as one node, and communication in any form such as a one-to-one form, a one-to-many form, a many-to-one form, or a many-to-many form may exist between any two or more nodes. For example, one network device may communicate with at least one terminal device and/or at least one network device, and one terminal device may also communicate with at least one network device and/or at least one terminal device. For example, as shown in FIG. 1, the network device 101 may communicate with the terminal device 103, or may communicate with the network device 102, or may communicate with at least two of the terminal device 103, the terminal device 104, and the network device 102. For another example, the terminal device 104 may communicate with the network device 101, or may communicate with the terminal device 103, or may communicate with at least two of the network device 101, the network device 102, and the terminal device 103.

It should be understood that FIG. 1 is merely a simplified schematic diagram of an example for ease of understanding. The communication system may further include another network device or another terminal device that is not shown in FIG. 1.

Figure 2:
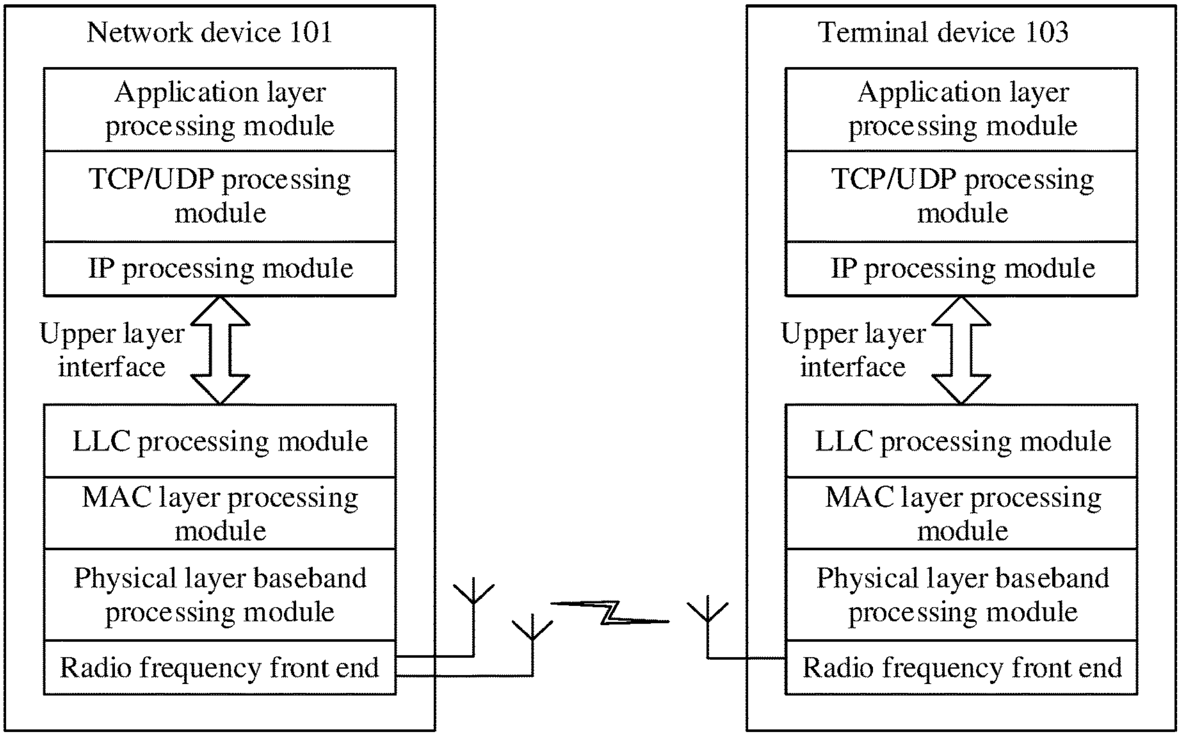
FIG. 2 is a schematic diagram of internal structures of a terminal device and a network device according to an embodiment.

FIG. 2 is a schematic diagram of internal structures of the network device 101 and the terminal device 103. As shown in FIG. 2, both the network device 101 and the terminal device 103 include an application layer processing module, a transmission control protocol (TCP)/user datagram protocol (UDP) processing module, an Internet protocol (IP) processing module, a logical link control (LLC) processing module, a media access control (MAC) layer processing module, a physical layer baseband processing module, a radio frequency front end, and an antenna. The IP processing module is connected to the LLC processing module through an upper layer interface.

It should be noted that FIG. 2 shows only the network device 101 configured with two antennas and the terminal device 103 configured with one antenna. During actual application, one or more antennas may be configured for each of the network device 101 and the terminal device 103. Actually, in modern communication systems, a multi-antenna technology is widely applied in, for example, Wi-Fi, LTE, and 5G NR systems. A node such as the network device 101 or the terminal device 103 may send or receive a signal by using a plurality of antennas, which is referred to as a multiple-input multiple-output (MIMO) technology for short. In a communication system that supports MIMO, a node may obtain gains such as diversity and multiplexing by adjusting a MIMO sending/receiving solution, for example, adjusting a weight of a transmit antenna or allocating different signals to different antennas, to increase a system capacity and improve system reliability.

Figure 3:
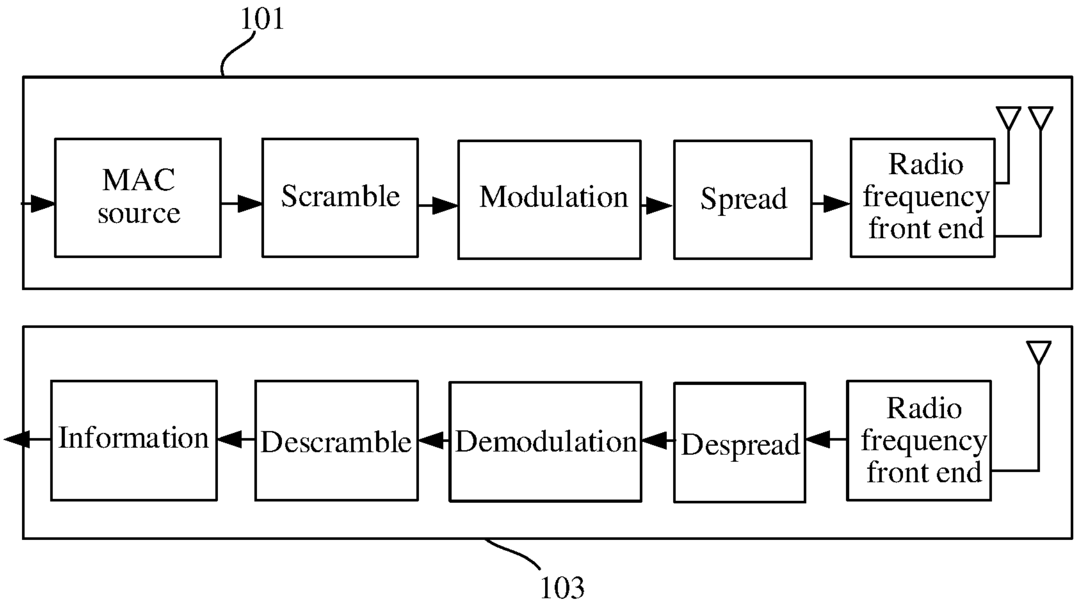
FIG. 3 is a schematic diagram of a transmission process between a sender and a recipient in an 802.11b Wi-Fi® protocol according to an embodiment.

A transmission process (refer to FIG. 3) between a sender and a recipient in the 802.11b standard Wi-Fi® protocol is described in detail as follows. For the sender such as the network device 101, the physical layer baseband processing module is configured to scramble and modulate binary user data, that is, an information bit, of the MAC layer processing module (that is, a MAC source), to generate a modulation symbol, then spread the modulation symbol to generate a radio frequency signal, and send the radio frequency signal by using an antenna of the radio frequency front end. For the recipient such as the terminal device 103, the physical layer baseband processing module is configured to perform despreading (despreading, that is, an inverse process of spreading), demodulation, and descrambling (descrambling, that is, an inverse process of scrambling) on the radio frequency signal received by the radio frequency front end by using an antenna, to recover the information bit, so as to complete sending and receiving of the information bit, that is, the binary user data.

Figure 4:
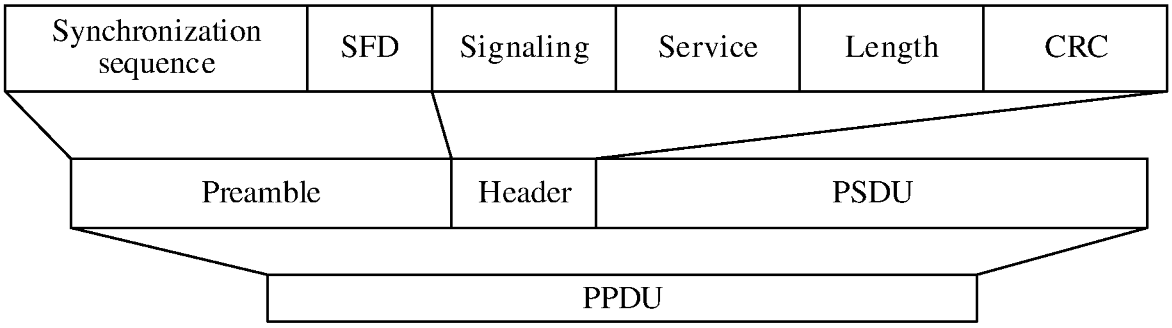
FIG. 4 is a schematic diagram of a structure of a WLAN frame according to an embodiment.
Figure 5:
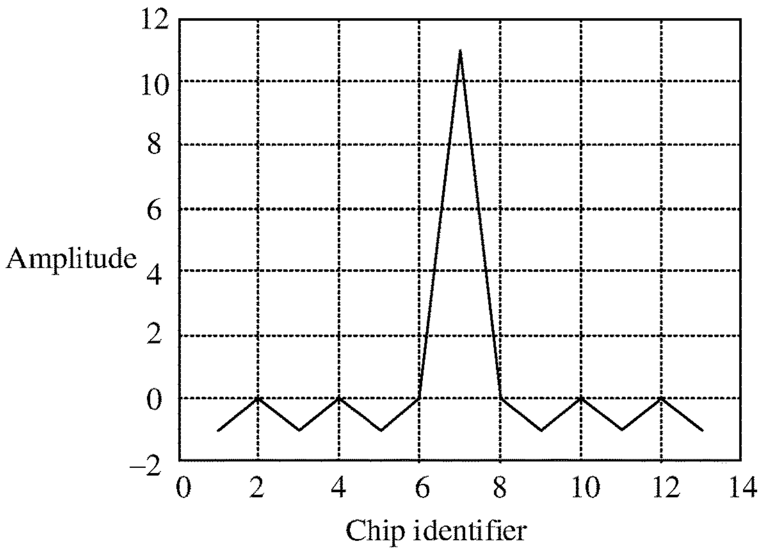
FIG. 5 is an amplitude curve of coherence superposition between chips (chips) of a Barker code according to an embodiment.

A WLAN physical frame transmitted in the foregoing transmission process is also referred to as a WLAN frame. Refer to FIG. 4, in 802.11b, the Wi-Fi® physical frame is used as a physical layer convergence protocol (PLCP) data unit (PPDU). A structure of the WLAN frame includes a PLCP preamble (referred to as a preamble for short), a PLCP header (referred to as a header for short), and a PLCP service data unit (PSDU). Generally, a payload is used as the PSDU. The preamble includes a synchronization sequence (SYNC) and a start frame delimiter (SFD). Generally, a length of a long preamble is 144 bits, including a 128-bit synchronization sequence located at a front part and a 16-bit SFD located at a rear part. A length of a short preamble is 72 bits, including a 56-bit synchronization sequence located at a front part and a 16-bit SFD located at a rear part. The SYNC of the long preamble is 128-bit "1" obtained after scrambling (for example, a code of a scrambler used for scrambling may be "1101100"), and the SYNC of the short preamble is 56-bit "0" obtained after scrambling. The SYNC is used to wake up a recipient to synchronize with a received signal. The SFD is used to notify the recipient that some parameters related to a MAC layer start to be transmitted immediately after the SFD ends. A value of the SFD may be, for example, 1111 0011 1010 0000. When the recipient receives the SFD, it indicates that the header is to be sent subsequently. The preamble is usually modulated by using differential binary phase shift keying (DBPSK) and transmitted at a rate of 1 M. A modulation algorithm of the preamble is fixed. A modulation algorithm of the header may be DBPSK or quadrature binary phase shift keying (QBPSK). The PSDU may use another modulation algorithm, for example, DBPSK, QBPSK, complementary code keying (CCK) (CCK5.5 or CCK11), or the like. The header includes physical parameters related to data transmission, and these parameters include signaling (SIGNALING), service (SERVICE), a length (LENGTH) of data to be transmitted, and a 16-bit CRC check code. Based on these parameters, the recipient adjusts a receiving rate, selects a decoding scheme, and determines when to stop data receiving. A length of the signaling (SIGNALING) field is 8 bits and the field defines a data transmission rate. The field has four values: 0 Ah, 14 h, 37h, and 6 Eh, which respectively specify transmission rates 1 Mbps, 2 Mbps, 5.5 Mbps, and 11 Mbps. The recipient adjusts the receiving rate based on the values. A length of the service (SERVICE) field is also 8 bits. The field specifies a modulation code (CCK or packet binary convolutional coding (PBCC)) to be used. A length of the length (LENGTH) field is 16 bits and the field indicates a period of time (a unit thereof is microsecond) that needs to be used to send a subsequent PSDU. The 16-bit CRC check code is used to check whether received signaling, service, and length fields are correct. The preamble and the header are transmitted at a fixed rate of 1 Mbps. The PSDU part may be transmitted at a rate of 1 Mbps (DBPSK modulation), 2 Mbps (DQPSK modulation), 5.5 Mbps (CCK or PBCC), or 11 Mbps (CCK or PBCC). In recent years, more and more Internet of Things (Internet of Things, IOT) devices that serve as STAs appear in a home network, and even common home appliances have an attribute of an IoT device by integrating a WLAN module. An IoT device generally has the following features: low costs, low power consumption, low traffic, and wide coverage. In Wi-Fi-based Internet of Things devices, the 802.11b standard has extremely high potential and has the foregoing features. Generally, when an AP sends a WLAN frame, a gain of a preamble in the WLAN frame detected by an IoT device based on the 802.11b standard comes from a spreading gain of the AP. In the 802.11b standard, the AP uses a conventional Barker code whose chip length is 11 to spread a scrambled (scrambling processing) preamble, and a spreading gain is about 10.4 dB. However, in a complex home environment, for example, a common home user generally has only one AP, and IoT devices (smart home devices such as a refrigerator, an air conditioner, a color TV, a smart curtain, a smart camera, and a smart home) may be distributed in various locations of a home, which imposes a strict requirement on a coverage capability of each device. Especially in an ultra-low signal-to-noise ratio (SNR) scenario, because symbols of a scrambled preamble are discretely distributed, and a maximum length of coherence superposition between chips of a Barker code used for spreading is limited by a period 11. FIG. 5 shows an amplitude curve of coherence superposition between chips of a Barker code, where a maximum amplitude (10.4 dB) is reached at a position where a chip identifier is 7. A maximum peak value of a synchronization sequence of a preamble for spreading based on a Barker chip whose chip length is 11 is limited by the maximum length (11) of coherence superposition between chips of the Barker code, therefore, the maximum peak value of the synchronization sequence may be submerged by noise, and the peak value cannot be detected. Consequently, acquisition cannot be performed on the IoT device. Therefore, the spreading gain cannot meet a wide coverage requirement. As a result, an IoT device in the 802.11b standard has a weak anti-interference capability and a poor access capability, affecting user experience. In this application, one or more segments of an extension code provided in this embodiment of this application are mainly used to replace a synchronization sequence of a preamble of a WLAN frame. Because the extension code is generated based on a Barker code, symbols of the extension code are correlated. In this way, in a WLAN frame transmission process, after the synchronization sequence is spread by using the Barker code, chips formed by spreading different symbols included in the extension code are also correlated. Compared with the current technology (symbols in a current synchronization sequence are discrete points, and therefore, only chips formed by spreading each symbol are correlated), a longer chip length and a longer period can be correlated and superimposed, so that a higher detection peak value can be obtained, thereby improving an anti-interference capability of an IoT device, and further improving a coverage capability.

Optionally, the network device 101 and the terminal device 103 in this embodiment of this application may also be referred to as communication apparatuses. For example, the network device 101 is referred to as a first communication apparatus, and the terminal device 103 is referred to as a second communication apparatus. The communication apparatus may be a general-purpose device or a dedicated device. This is not specifically limited in this embodiment of this application.

Figure 6:
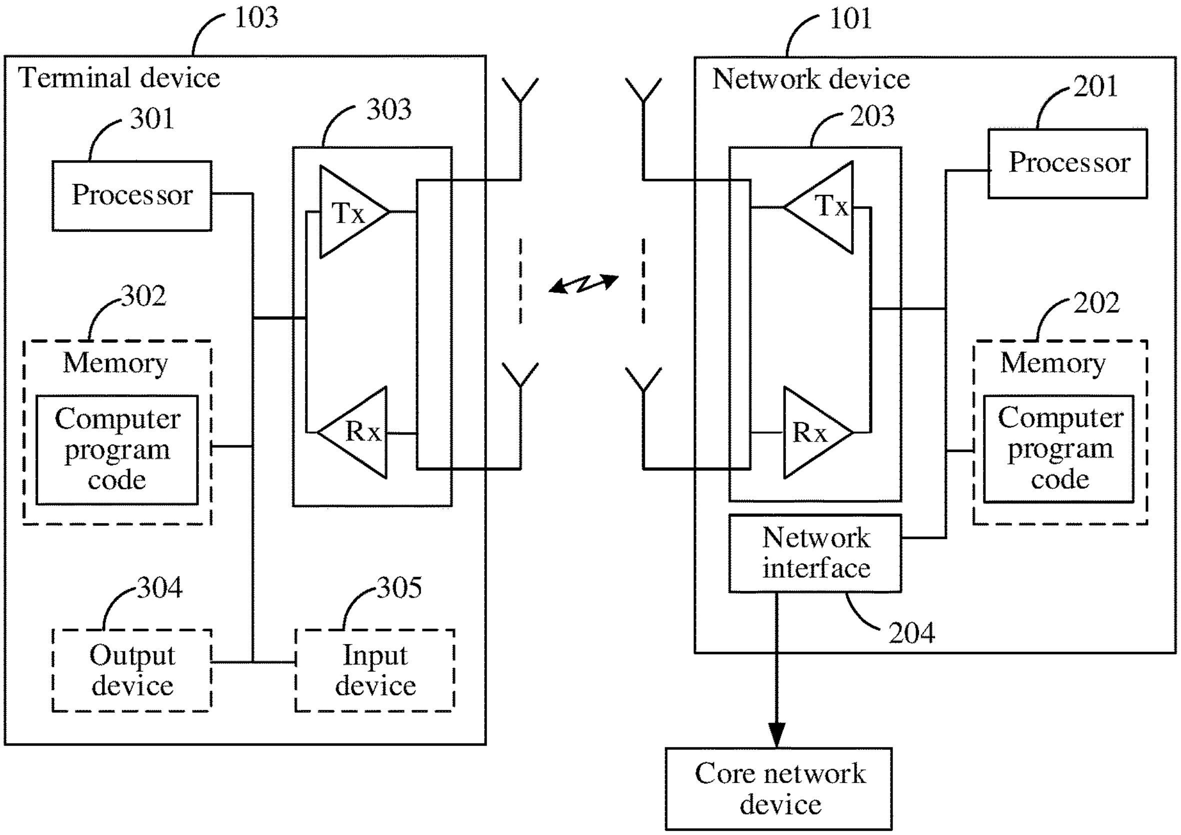
FIG. 6 is a schematic diagram of hardware structures of a terminal device and a network device according to an embodiment.

Optionally, FIG. 6 is a schematic diagram of structures of a network device 101 and a terminal device 103 according to an embodiment of this application.

The terminal device 103 includes at least one processor (an example in which one processor 301 is included is used for description in FIG. 6) and at least one transceiver (an example in which one transceiver 303 is included is used for description in FIG. 6). Optionally, the terminal device 103 may further include at least one memory (an example in which one memory 302 is included is used for description in FIG. 6), at least one output device (an example in which one output device 304 is included is used for description in FIG. 6), and at least one input device (an example in which one input device 305 is included is used for description in FIG. 6).

The processor 301, the memory 302, and the transceiver 303 are connected through a communication line. The communication line may include a path for transmitting information between the foregoing components.

The processor 301 may be a general-purpose central processing unit (CPU), a microprocessor, an application-specific integrated circuit (ASIC), or one or more integrated circuits configured to control program execution of the solutions in this application. During specific implementation, in an embodiment, the processor 301 may alternatively include a plurality of CPUs, and the processor 301 may be a single-core (single-CPU) processor or a multi-core (multi-CPU) processor. The processor herein may be one or more devices, circuits, or processing cores configured to process data (for example, computer program instructions).

The memory 302 may be an apparatus having a storage function. For example, the memory may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another optical disc storage, optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. The memory 302 may exist independently, and is connected to the processor 301 through the communication line. The memory 302 may alternatively be integrated with the processor 301.

The memory 302 is configured to store computer-executable instructions for executing the solutions of this application, and the execution is controlled by the processor 301. Specifically, the processor 301 is configured to execute the computer-executable instructions stored in the memory 302, to implement the communication method for a WLAN system in embodiments of this application.

Alternatively, optionally, in this embodiment of this application, the processor 301 may perform a processing-related function in the communication method for a WLAN system provided in the following embodiments of this application. The transceiver 303 is responsible for communicating with another device or a communication network. This is not specifically limited in this embodiment of this application.

Optionally, the computer-executable instructions in this embodiment of this application may also be referred to as application program code or computer program code. This is not specifically limited in this embodiment of this application.

The transceiver 303 may use any apparatus such as a transceiver, and is configured to communicate with another device or a communication network. The transceiver 303 includes a transmitter (Tx) and a receiver (Rx). For example, in this embodiment of this application, the terminal device 103 receives a WLAN frame by using the receiver.

The output device 304 communicates with the processor 301, and may display information in a plurality of manners. For example, the output device 304 may be a liquid crystal display (LCD), a light emitting diode (LED) display device, a cathode ray tube (CRT) display device, or a projector.

The input device 305 communicates with the processor 301, and may receive an input of a user in a plurality of manners. For example, the input device 305 may be a mouse, a keyboard, a touchscreen device, or a sensing device.

The network device 101 includes at least one processor (an example in which one processor 201 is included is used for description in FIG. 6), at least one transceiver (an example in which one transceiver 203 is included is used for description in FIG. 6), and at least one network interface (an example in which one network interface 204 is included is used for description in FIG. 6). Optionally, the network device 101 may further include at least one memory (an example in which one memory 202 is included is used for description in FIG. 6). The processor 201, the memory 202, the transceiver 203, and the network interface 204 are connected through a communication line. The network interface 204 is configured to connect to a core network device by using a link (for example, an S1 interface), or connect to a network interface of another network device by using a wired or wireless link (for example, an X2 interface) (not shown in FIG. 6). This is not specifically limited in this embodiment of this application. In addition, for related descriptions of the processor 201, the memory 202, and the transceiver 203, refer to the descriptions of the processor 301, the memory 302, and the transceiver 303 in the terminal device 103. Details are not described herein again. The transceiver 203 may use any apparatus such as a transceiver, and is configured to communicate with another device or a communication network. The transceiver 203 includes a transmitter (Tx) and a receiver (Rx). For example, in this embodiment of this application, the network device 101 transmits a WLAN frame by using the transmitter.

Figure 7:
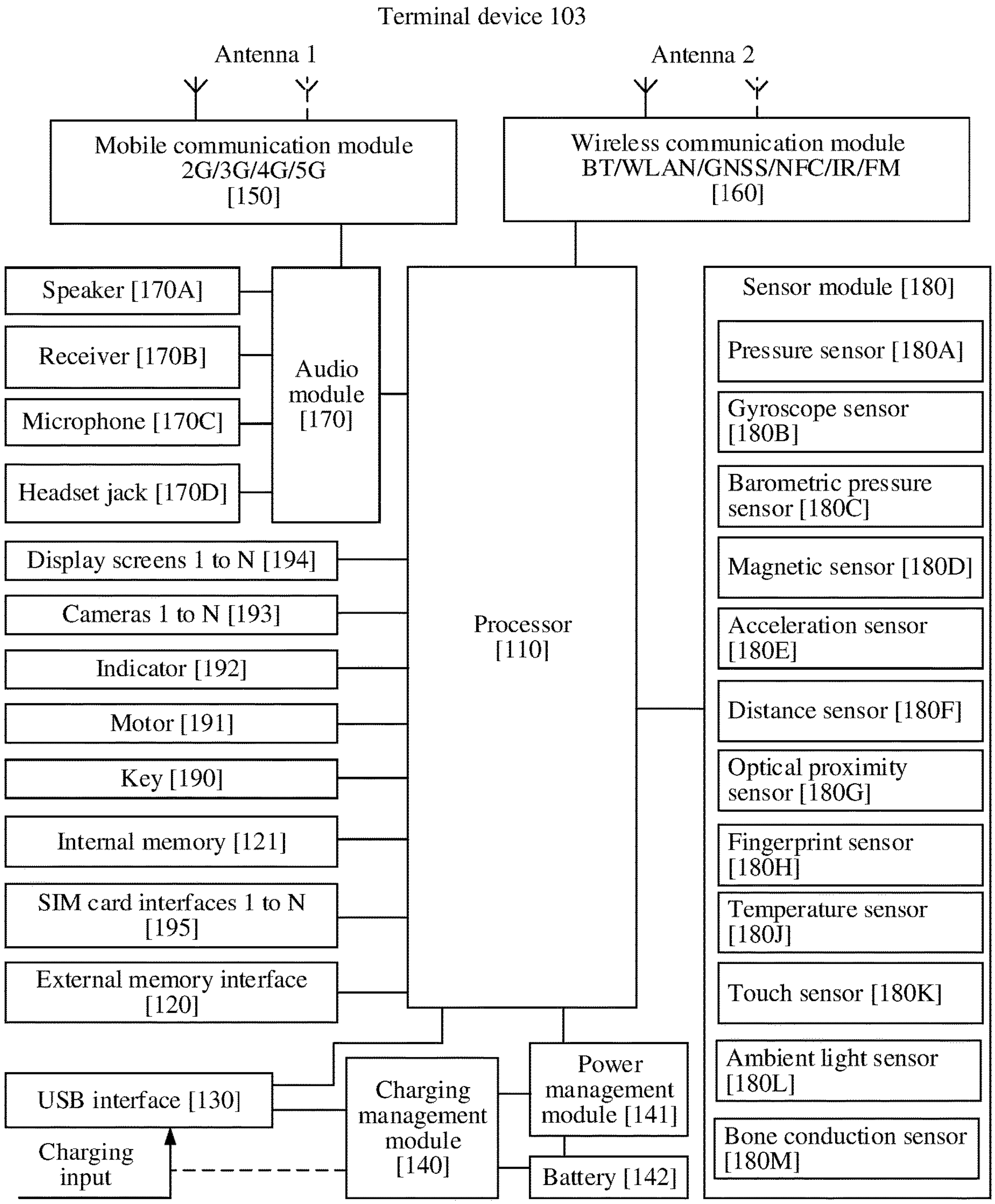
FIG. 7 is a schematic diagram of a hardware structure of a terminal device according to an embodiment.

With reference to the schematic diagram of the structure of the terminal device 103 shown in FIG. 6, for example, FIG. 7 is a specific structural form of the terminal device 103 according to an embodiment of this application.

In some embodiments, a function of the processor 301 in FIG. 6 may be implemented by a processor 110 in FIG. 7.

In some embodiments, a function of the transceiver 303 in FIG. 6 may be implemented by using an antenna 1, an antenna 2, a mobile communication module 150, a wireless communication module 160, and the like in FIG. 7.

The antenna 1 and the antenna 2 are configured to transmit and receive electromagnetic wave signals. Each antenna in the terminal device 103 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the terminal device 103. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to a modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device with at least some modules of the processor 110.

The wireless communication module 160 may provide a solution to wireless communication such as a wireless local area network (WLAN) (such as a Wi-Fi® network), Bluetooth (BT), a global navigation satellite system (GNSS), frequency modulation (FM), near field wireless communication (NFC), and an infrared technology (IR) applied to the terminal device 103. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. When the terminal device 103 is a first device, the wireless communication module 160 may provide a solution to NFC wireless communication applied to the terminal device 103, which means that the first device includes an NFC chip. The NFC chip may improve an NFC wireless communication function. When the terminal device 103 is a second device, the wireless communication module 160 may provide a solution to NFC wireless communication applied to the terminal device 103, which means that the first device includes an electronic label (for example, a radio frequency identification (RFID) label). When approaching the electronic label, an NFC chip of another device may perform NFC wireless communication with the second device.

In some embodiments, the antenna 1 of the terminal device 103 is coupled to the mobile communication module 150, and the antenna 2 is coupled to the wireless communication module 160, so that the terminal device 103 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, or an IR technology. The GNSS may include a global positioning system (GPS), a global navigation satellite system (GLONASS), a BeiDou navigation satellite system (BDS), a quasi-zenith satellite system (QZSS), or a satellite based augmentation system (SBAS).

In some embodiments, a function of the memory 302 in FIG. 6 may be implemented by using an internal memory 121 or an external memory (such as a Micro SD card) connected to an external memory interface 120 in FIG. 7.

In some embodiments, a function of the output device 304 in FIG. 6 may be implemented by using a display screen 194 in FIG. 7. The display screen 194 is configured to display an image, a video, and the like. The display screen 194 includes a display panel.

In some embodiments, a function of the input device 305 in FIG. 6 may be implemented by using a mouse, a keyboard, a touchscreen device, or a sensor module 180 in FIG. 7. For example, as shown in FIG. 7, the sensor module 180 may include one or more of a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M. This is not specifically limited in this embodiment of this application.

In some embodiments, as shown in FIG. 7, the terminal device 103 may further include one or more of an audio module 170, a camera 193, an indicator 192, a motor 191, a key 190, an SIM card interface 195, a USB interface 130, a charging management module 140, a power management module 141, and a battery 142. The audio module 170 may be connected to a speaker 170A (also referred to as a "horn"), a receiver 170B (also referred to as an "earpiece"), and a microphone 170C (also referred to as a "mouthpiece" or a "mike"), a headset jack 170D, or the like. This is not specifically limited in this embodiment of this application.

It may be understood that the structure shown in FIG. 7 does not constitute a specific limitation on the terminal device 103. For example, in some other embodiments of this application, the terminal device 103 may include more or fewer components than those shown in the figure, or combine some components, or split some components, or have different component arrangements. The components shown in the figure may be implemented by hardware, software, or a combination of software and hardware.

With reference to FIG. 1 to FIG. 7, the following describes, by using an example in which the network device shown in FIG. 1 interacts with any terminal device, a communication method for a WLAN system according to an embodiment of this application.

It should be noted that names of messages between network elements, names of parameters in the messages, or the like in the following embodiments of this application are merely examples, and there may be other names in a specific implementation. This is not specifically limited in embodiments of this application.

Figure 8:
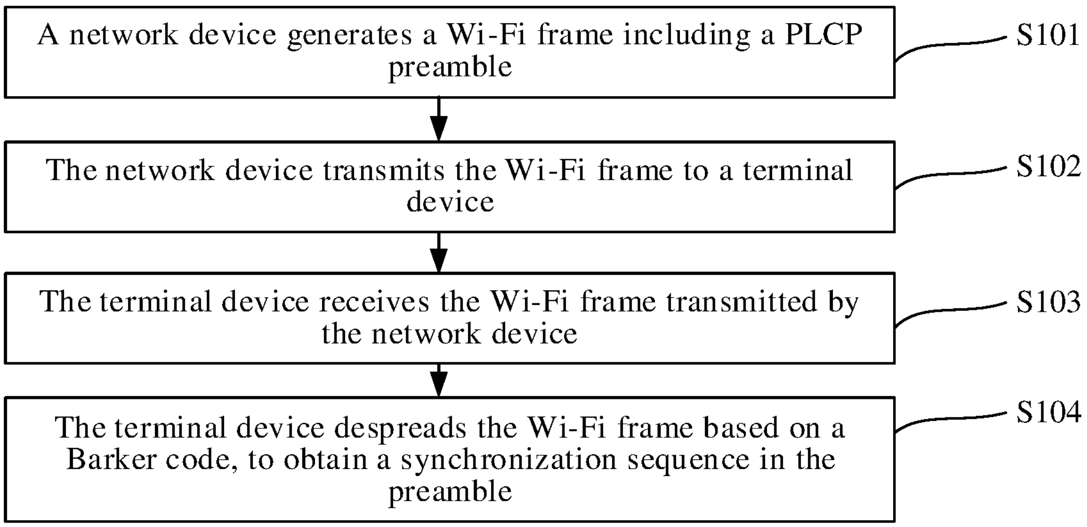
FIG. 8 is a schematic flowchart of a communication method for a WLAN system according to an embodiment.

FIG. 8 shows a communication method for a WLAN system according to an embodiment of this application. An example in which a network device transmits a WLAN frame to a terminal device is used for description. The communication method for a WLAN system includes step S101 to step S104.

S101. A network device generates a WLAN frame including a PLCP preamble.

A synchronization sequence of the PLCP preamble includes at least one extension code, and the extension code includes N symbols generated based on a Barker code, where $N=\alpha*M$, M is a chip length of the Barker code, and $\alpha$ is a positive integer. For a Barker code having 11 chips, M=11, and $\alpha=1, 2, 3, \ldots, n$.

Specifically, a generation manner of the extension code includes but is not limited to the following manners:

Manner 1: A spreading sequence c of the extension code meets the following formula: $c=s\otimes b$.

The extension code s is $s=r\otimes b$, where b is the Barker code, and $r=[+1;-1]$. Specifically, the Barker code is used as a base code to construct a spreading sequence of a new extension code, which is as follows: $c=s\otimes b$. A sequence of the base code (a Barker code specified in the 802.11b standard) is $b=[+1,+1,+1,-1,-1,-1,+1,-1,-1,+1,-1]$. The extension code is s, and a construction method of the extension code includes but is not limited to the following method. A symbol length of s is recorded as N, the extension code $s=r\otimes b$ is constructed based on the Barker code and an anti-periodic flipping code r, and $s=[+1,+1,+1,-1,-1,-1,+1,-1,-1,+1,-1,-1,-1,-1,+1,+1,+1,-1,+1,+1,-1,+1]$, where $\alpha=2$. A main function of a sequence $r=[+1;-1]$ of the anti-periodic flipping code is to avoid periodicity of a code sequence, so as to prevent damage to a power spectrum density and impact on peak-to-average ratio performance.

Manner 2: The extension code may be obtained from a spreading sequence generated by spreading an initial sequence based on the Barker code. For example, the extension code is constructed based on searching. Generally, a synchronization sequence in a preamble is randomly scrambled and then spread and transmitted based on a Barker code. Searching may be performed by using cross-correlation and auto-correlation properties of a transmitted sequence as performance evaluation bases, and a segment of continuous sequences with optimal performance is found from the transmitted sequence as an extension code. A detailed process is as follows.

S1. Generate a scrambling code sequence R(i) based on a scrambling code generation polynomial $G(z)=z^{-7}+z^{-4}+1$ in the 802.11b standard.

S2. Perform scrambling on an initial sequence (a 128-bit all-1 sequence or a 56-bit all-0 sequence) whose length is L.

$$\begin{cases} C_{R-ACQ}(i) = R(i) \oplus c_{ACQ}(i); \\ c_{ACQ}(i) = \{1, 1, \ldots, 1\} \text{ or } \{\{0, 0, \ldots, 0\},. \\ i = 0, 1, \ldots, L-1, L = 128, \text{ or } 56 \end{cases}$$

$c_{ACQ}(i)$ is an initial sequence (for example, which may be a synchronization sequence of a conventional preamble) before scrambling, and R(i) is the scrambling code sequence generated in step S1.

S3. Perform Barker code spreading on a scrambled sequence $c_{R-ACQ}(i)$.

$$c_{R-ACQ-barker}(l) = c_{R-ACQ}(i) \otimes b(k);$$

$$i = 0, 1, \ldots, L-1; k = 0, 1, \ldots, 10; 1 = 0, 1, \ldots, L*11-1;$$

$$b(k) = [+1, +1, +1, -1, -1, -1, +1, -1, -1, +1, -1].$$

S4. Search for an extension code in $c_{R-ACQ-barker}(1)$ based on a search criterion.

The search criterion is as follows: If a larger peak value $y_{first}$ of a main lobe of a selected sequence indicates a smaller peak value $y_{secend}$ of a side lobe, and a ratio $$R_{ratio} = \frac{y_{first}}{y_{secend}}$$

of the peak value of the main lobe to the peak value of the side lobe is greater than a threshold TH=β*N*11 (0<β<1, which is configurable based on a performance requirement), it is determined that the selected sequence meets a requirement.

Based on the search criterion, a Monte Carlo method is used to search for an extension code whose length is N*11 in a chip sequence of $c_{R-ACQ-barker}(1)$. A pseudo code is described as follows:

$$\text{For } g = 1, 2, \ldots, L-N-1;$$

Take out a sequence $c_{s-ACQ-barker}$ (j) corresponding to a position g:

$$c_{s-ACQ-barker}(j) = c_{R-ACQ-barker}\{x\};$$

$$j = 0, 1, \ldots, N*11-1,$$

$$x = (g-1)*11+1, (g-1)*11+2, \ldots, (g+N)*11;$$

Calculate an auto-correlation function of the sequence $c_{s-ACQ-barker}$ (j): $y_{corr}$ (k):

$$y_{corr}(k) = E[c^*_{s-ACQ-barker}(j) * c_{s-ACQ-barker}(j)],$$

-continued $$j = 1, 2, \ldots, N*11-1;$$

$$k = 0, 1, \ldots, 2*N*11-1.$$

Search for a main lobe value $y_{first}$ and a side lobe value $y_{secend}$, and a ratio $R_{ratio}$:

$$\begin{cases} y_{first} = \text{FirstMax}(y_{corr}(k)); \\ y_{second} = \text{SecondMax}(y_{corr}(k)); \end{cases}$$

$$R_{ratio} = \frac{y_{first}}{y_{second}};$$

Determine whether a threshold is met:

$$R_{ratio} \geq TH;$$

$$TH = \beta*N*11,$$

$$0 < \beta < 1.$$

If the formula is met, the extension code is found, and the searching is stopped;

If the formula is not met, continue to perform searching: g=g+1;

End

Based on this step, a value of g may be obtained, that is, a symbol position corresponding to the extension code in the chip sequence of $C_{R-ACQ}(i)$.

S5. Take out a symbol s(n) from a symbol sequence $C_{R-ACQ}(i)$ based on g, that is, a constructed extension code.

$$s(n) = c_{R-ACQ}(\gamma),$$

$$n = 0, 1, \ldots, N-1,$$

$$\gamma = g, g+1, \ldots, g+N.$$

S6. Construct a spreading sequence c based on the extension code s(n) and a Barker code. c=s⊗b;

For example, the following segment of sequence is found as the extension code s, $$s = [+1, +1, -1, +1, +1; +1, +1, -1, -1, +1; \\ -1, +1, -1, +1, -1; -1, +1, -1, -1, -1, ; +1, -1]$$

Figure 9:
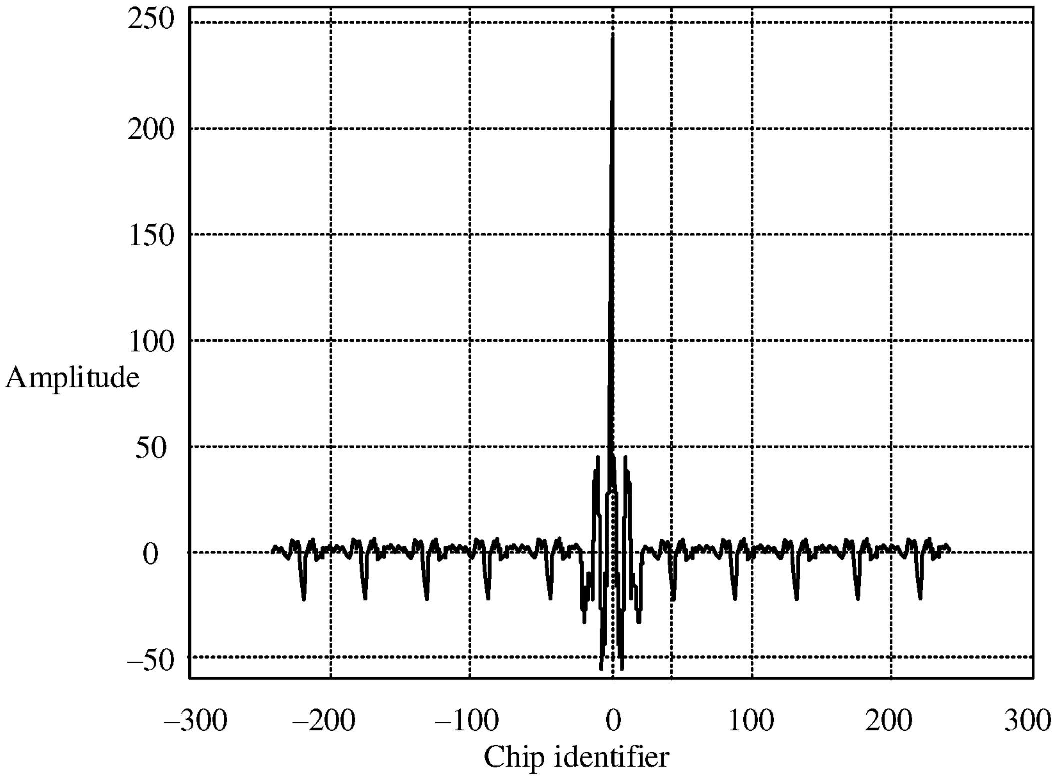
FIG. 9 is an amplitude curve of coherence superposition of chips generated after spreading of an extension code according to an embodiment.

In this way, when the synchronization sequence of the preamble constructed based on the foregoing manner includes an extension code (for example, α=2) constructed based on the manner 1 or manner 2, when the network device serving as a sender transmits the WLAN frame and spreads the synchronization sequence, because the extension code in the synchronization sequence is generated based on the Barker code, that is, symbols of the extension code have coherence, 242 chips generated after Barker code (11 bits) spreading also have coherence superposition performance. Refer to FIG. 9, the 242 chips obtain a gain close to 250 dB, which is nearly 22 times higher than a peak value detected in the current technology. In this way, a terminal device serving as a recipient may detect the peak value of the gain close to 250 dB by using a coherence superposition and estimation algorithm, thereby improving performance of preamble-based synchronization.

Figure 10:
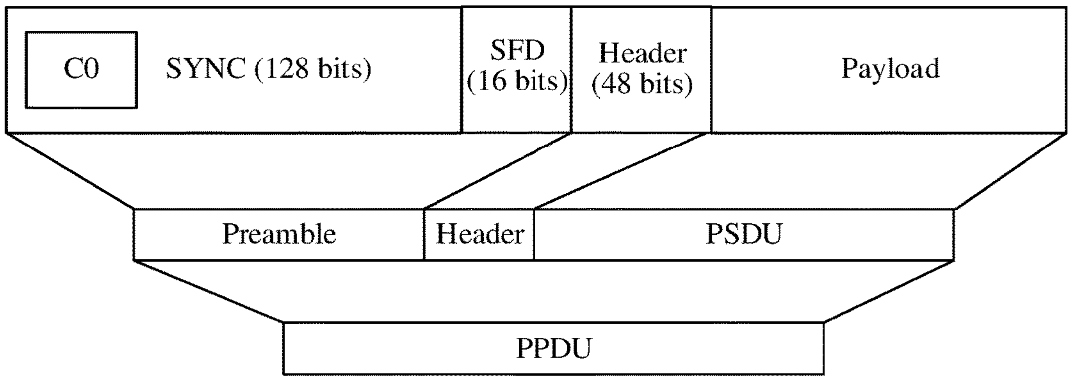
FIG. 10 is a schematic diagram of a structure of a WLAN frame according to another embodiment.
Figure 11:
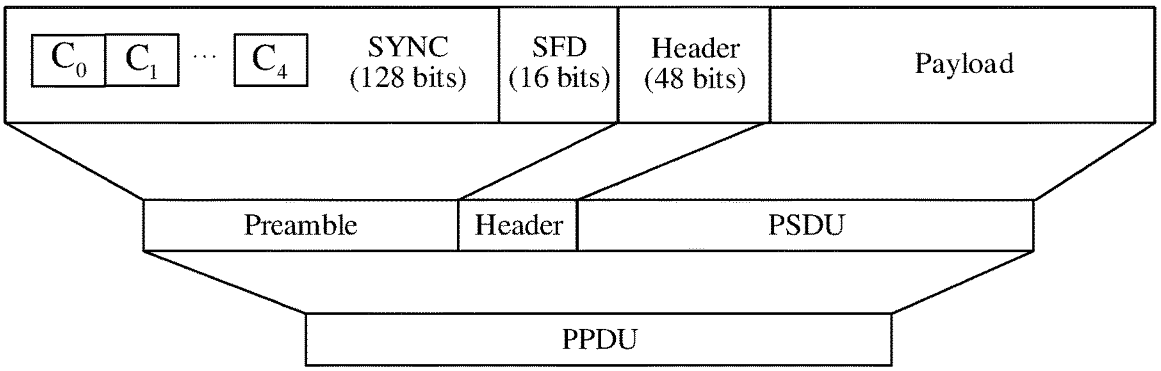
FIG. 11 is a schematic diagram of a structure of a WLAN frame according to still another embodiment.
Figure 12:
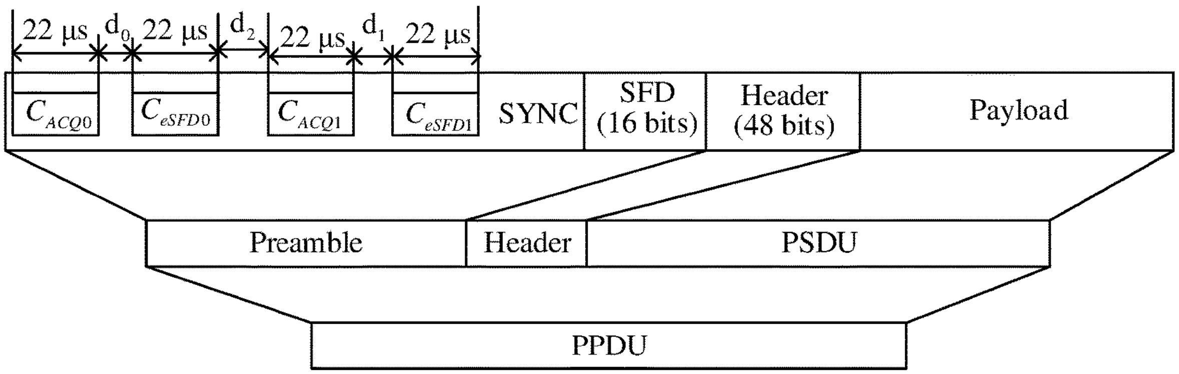
FIG. 12 is a schematic diagram of a structure of a WLAN frame according to yet another embodiment.

Specifically, based on the synchronization code segment constructed in the foregoing manner 1 or manner 2, for a structure of a designed WLAN frame, refer to FIG. 10, FIG. 11, and FIG. 12. Specific descriptions are as follows:

An extension code is placed at a fixed position of a synchronization sequence of the WLAN frame shown in FIG. 10, and a spreading sequence of the extension code is $C_0$=c. For example, the extension code may be used to replace a symbol at the position in the current synchronization sequence.

Specifically, the network device serving as a transmitter generates a standard Barker code-based synchronization sequence based on a requirement of the 802.11b standard, scrambles the sequence, and records a scrambled sequence as $c_{R\text{-}ACQ}$(i), i=0, 1, . . . , L−1; L=128 or 56. In this case, specific steps of constructing the WLAN frame are as follows: In step S1, a scrambling code sequence R(i) is generated based on a scrambling code generation polynomial $G(z)=z^{-7}+z^{-4}+1$ in 802.11b. In step S2, scrambling is performed on an all-1 or all-0 synchronization sequence (symbol) whose length is L.

$$\begin{cases} c_{R-ACQ}(i) = R(i) \oplus c_{ACQ}(i); \\ c_{ACQ}(i) = \{1, 1, \dots, 1\} \text{ or } \{0, 0, \dots, 0\}, i = 0, 1, \dots, L-1; \end{cases}$$

$c_{ACQ}$(i) is an original all-1 or all-0 symbol sequence before scrambling, and R(i) is a scrambled sequence generated in S1. In step S3, a segment of sequence in the original sequence $c_{R\text{-}ACQ}$(i) is replaced with a spreading sequence $C_0$, i=0, 1, . . . , J−1; of an extension code, where a start position S for replacement and a replacement sequence length J are configurable, the sequence length J is selected based on a performance requirement, and a sequence after replacement is recorded as $C_{hybrid}$(i):

$$C_{hybrid}(i) = \begin{cases} C_0(j), i = S + j; \\ c_{R-ACQ}(i), i \neq S + j; \end{cases}$$

$$j = 0, 1, \dots, J-1;$$

$$i = 0, 1, \dots, L-1;$$

$$J < L;$$

j is an index of a symbol of the spreading sequence of the extension code, and S is a start position of replacement of the spreading sequence of the extension code in the original sequence $c_{R\text{-}ACQ}$(i). In this case, the network device serving as the transmitter performs spreading (Barker spreading) based on a protocol requirement in a process of transmitting the WLAN frame in a subsequent step, that is, performs Barker code spreading on the replaced symbol sequence $C_{hybrid}$(i), to generate a spreading sequence:

$$C(l) = C_{hybrid}(i) \otimes b(k),$$

$$i = 0, 1, \dots, L-1;$$

-continued $$k = 0, 1, \dots, 10;$$

$$l = 0, 1, \dots, L*11-1.$$

In this way, because the terminal device serving as a recipient has known the sequence $C_{hybrid}$(i), the terminal device may perform synchronization position detection based on the sequence $C_{hybrid}$(i) by using a coherence algorithm, so that coherence combination performance shown in FIG. 9 may be obtained, and a higher coherence peak value may be detected in a synchronization sequence detection process. In addition, when coherence coarse frequency estimation, coherence fine frequency offset estimation, coherence channel estimation, and the like are performed based on a result of the synchronization position detection, parameter estimation performance may also be improved.

In another example, a synchronization sequence of the WLAN frame shown in FIG. 10 includes a plurality of extension codes. For example, five extension codes are placed in the synchronization sequence. A spreading sequence of the extension code is: $C_k$=p⊗c, k=0, 1, . . . , K−1, K∈[0,1,2,3,4], and an anti-inversion periodic code is p=[+1,−1,−1,+1,−1].

Specifically, the network device serving as a transmitter generates a standard Barker code-based synchronization sequence based on a requirement of the 802.11b standard, scrambles the sequence, and records a scrambled sequence as $c_{R\text{-}ACQ}$(i), i=0, 1, . . . , L−1; L=128 or 56. In this case, specific steps of constructing the WLAN frame are as follows: In step S1, a scrambling code sequence R(i) is generated based on a scrambling code generation polynomial $G(z)=z^{-7}+z^{-4}+1$ in 802.11b. In step S2, scrambling is performed on an all-1 or all-0 synchronization sequence (symbol) whose length is L.

$$\begin{cases} c_{R-ACQ}(i) = R(i) \oplus c_{ACQ}(i); \\ c_{ACQ}(i) = \{1, 1, \dots, 1\} \text{ or } \{0, 0, \dots, 0\}, i = 0, 1, \dots, L-1; \end{cases}$$

$c_{ACQ}$(i) is an original all-1 or all-0 symbol sequence before scrambling, and R(i) is a scrambled sequence generated in S1. In step S3, k segments of sequences in the original sequence $c_{R\text{-}ACQ}$(i) are replaced with a spreading sequence $C_k$=p⊗c, k=0, 1, . . . , K−1, K∈[0,1,2,3,4] of an extension code, where a start position S for replacement, a replacement sequence length J, and the quantity K of segments are configurable, the sequence length J and the quantity K of segments are selected based on a performance requirement, and a sequence after replacement is recorded as $C_{hybrid}$(i):

$$C_{hybrid}(i) = \begin{cases} C_0(j), i = S + J*0 + j; \\ C_1(j), i = S + J*1 + j; \\ C_2(j), i = S + J*2 + j; \\ C_3(j), i = S + J*3 + j; \\ C_4(j), i = S + J*4 + j; \\ c_{R-ACQ}(i), i \neq S + j; \end{cases}$$

$$j = 0, 1, \dots, J-1;$$

$$i = 0, 1, \dots, L-1;$$

$$K*J < L;$$

j is an index of a symbol of the spreading sequence of the extension code, and S is a start position of replacement of the spreading sequence of the extension code in the original sequence $c_{R\text{-}ACQ}(i)$. In this case, the network device serving as the transmitter performs spreading (Barker spreading) based on a protocol requirement in a process of transmitting the WLAN frame in a subsequent step, that is, performs Barker code spreading on the replaced symbol sequence $C_{hybrid}(i)$, to generate a spreading sequence:

$$C(l) = C_{hybrid}(i) \otimes b(k),$$
$$i = 0, 1, \ldots, L-1;$$
$$k = 0, 1, \ldots, 10;$$
$$l = 0, 1, \ldots, L*11-1.$$

In this way, because the terminal device serving as a recipient has known the sequence $C_{hybrid}(i)$, the terminal device may perform synchronization position detection based on the sequence $C_{hybrid}(i)$ by using a coherence algorithm, so that coherence combination performance shown in FIG. 9 may be obtained, and a higher coherence peak value may be detected in a synchronization sequence detection process. In addition, when coherence coarse frequency estimation, coherence fine frequency offset estimation, coherence channel estimation, and the like are performed based on a result of the synchronization position detection, parameter estimation performance may also be improved.

In another example, a synchronization sequence of the WLAN frame shown in FIG. 11 includes two groups of extension codes, and each group of extension codes includes two extension codes. A spreading sequence of the first group of extension codes is $C_0=C_{ACQ0}$, $C_{eSFD0}$, a spreading sequence of a first extension code in the first group of extension codes is $C_{ACQ0}=+1\otimes c$, a spreading sequence of a second extension code in the first group of synchronization code segments is $C_{eSFD0}=-1\otimes c$, and an interval between the two sequences is first duration $d_0$ (for $d_0$, 5 μs is recommended); and a spreading sequence of the second group of extension codes is $C_1=[C_{ACQ1}, C_{eSFD1}]$, a spreading sequence of a third extension code in the second group of extension codes is $C_{ACQ1}=+1\otimes c$, a spreading sequence of a fourth extension code in the second group of extension codes is $C_{eSFD1}=-1\otimes c$, and an interval between the two sequences is second duration $d_1$ (for $d_1$, 7 μs is recommended). In addition, $d_0 \neq d_1$, which is used to avoid periodicity of spreading sequences of the two groups of extension codes.

Specifically, the network device serving as a transmitter generates a standard Barker code-based synchronization sequence based on a requirement of the 802.11b standard, scrambles the sequence, and records a scrambled sequence as $c_{R\text{-}ACQ}(i)$, i=0, 1, . . . , L−1; L=128 or 56. In this case, specific steps of constructing the WLAN frame are as follows: In step S1, a scrambling code sequence R(i) is generated based on a scrambling code generation polynomial $G(z)=z^{-7}+z^{-4}+1$ in 802.11b. In step S2, scrambling is performed on an all-1 or all-0 synchronization sequence (symbol) whose length is L.

$$\begin{cases} c_{R\text{-}ACQ}(i) = R(i) \oplus c_{ACQ}(i); \\ c_{ACQ}(i) = \{1, 1, \ldots, 1\} \text{ or } \{0, 0, \ldots, 0\}, i = 0, 1, \ldots, L-1; \end{cases}$$

$c_{ACQ}(i)$ is an original all-1 or all-0 symbol sequence before scrambling, and R(i) is a scrambled sequence generated in S1. In step S3, 2 groups of sequences in the original sequence $c_{R\text{-}ACQ}(i)$ are replaced with a spreading sequence $C_k(j)$, j=0, 1, . . . , J−1;k=0, 1 of an extension code, where a start position S for replacement and a replacement sequence length J are configurable, the sequence length J is selected based on a performance requirement, and a sequence after replacement is recorded as $C_{hybrid}(i)$;

$$C_{hybrid}(i) = \begin{cases} C_0(j), i = S + 2J*0 + j; \\ C_1(j), i = S + 2J*1 + j; \\ c_{R\text{-}ACQ}(i), i \neq S + j; \end{cases}$$
$$j = 0, 1, \ldots, J-1;$$
$$i = 0, 1, \ldots, L-1;$$
$$2*J < L;$$

j is an index of a symbol of the spreading sequence of the extension code, and S is a start position of replacement of the spreading sequence of the extension code in the original sequence $C_{R\text{-}ACQ}(i)$.

In this way, because the terminal device serving as a recipient has known the sequence $C_{hybrid}(i)$, the terminal device may perform synchronization position detection based on the sequence $C_{hybrid}(i)$ by using a coherence algorithm, so that coherence combination performance shown in FIG. 9 may be obtained, and a higher coherence peak value may be detected in a synchronization sequence detection process. In addition, when coherence coarse frequency estimation, coherence fine frequency offset estimation, coherence channel estimation, and the like are performed based on a result of the synchronization position detection, parameter estimation performance may also be improved. In addition, detection is performed on $C_{ACQ0}$ and $C_{eSFD0}$ (or $C_{ACQ1}$ and $C_{eSFD1}$) sequences in the spreading sequence of each group of extension codes in the synchronization sequence, to distinguish the two groups of sequences based on whether the $C_{ACQ0}$ and $C_{eSFD0}$ (or $C_{ACQ1}$ and $C_{eSFD1}$) sequences are reverse; and whether a group of extension codes is synchronized is identified by using an interval between peak values of the $C_{ACQ0}$ and $C_{eSFD0}$ sequences, so as to determine a synchronization position based on $C_{ACQ0}$ (or $C_{ACQ1}$) and determine a frame start position based on $C_{eSFD0}$ (or $C_{esFD1}$). An interval between the two groups of extension codes is third duration $d_2$ (for $d_2$, 11 μs is recommended), to increase a synchronization opportunity. The first duration $d_0$, the second duration $d_1$, and the third duration $d_2$ between each group and each sequence mainly play two functions: first, to identify a sequence for synchronization position detection and SFD detection; and second, to prevent a sequence from periodically appearing, and prevent damage a power spectrum density (power spectral density, PSD) of a Barker code.

S102. The network device transmits the WLAN frame to a terminal device.

S103. The terminal device receives the WLAN frame transmitted by the network device.

S104. The terminal device despreads the WLAN frame based on a Barker code, to obtain a synchronization sequence in the preamble.

In this application, one or more segments of an extension code provided in this embodiment of this application are mainly used to replace a synchronization sequence of a preamble of a WLAN frame. Because the extension code is generated based on a Barker code, symbols of the extension code are correlated. In this way, in a WLAN frame transmission process, after the synchronization sequence is spread by using the Barker code, chips formed by spreading different symbols included in the extension code are also correlated. Compared with the current technology (symbols in a current synchronization sequence are discrete points, and therefore, only chips formed by spreading each symbol are correlated), a longer chip length and a longer period can be correlated and superimposed, so that a higher detection peak value can be obtained, thereby improving an anti-interference capability of an IoT device, and improving a coverage capability and a wall penetration capability.

Figure 14A:
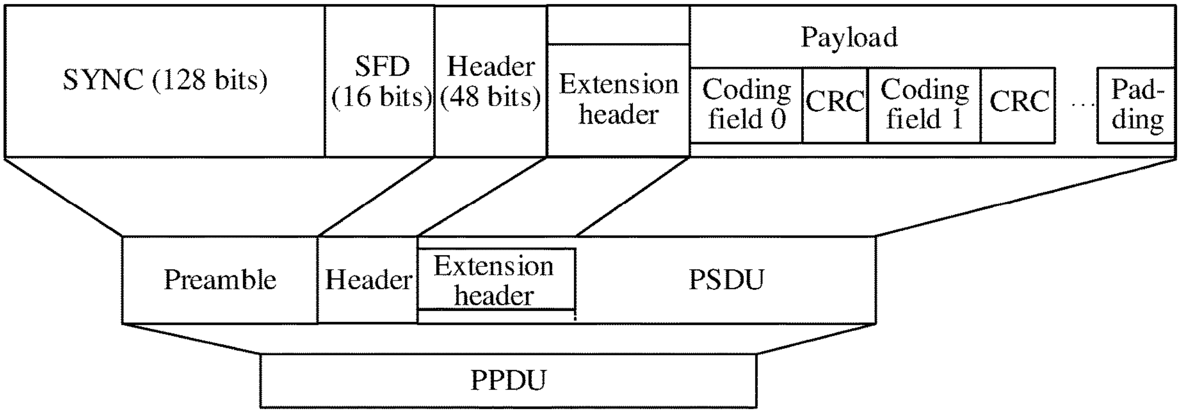
FIG. 14A is a schematic diagram of a structure of a WLAN frame according to another embodiment.

In the communication method for a WLAN system provided in this embodiment of this application, an example in which a network device transmits a WLAN frame to a terminal device is used for description. In this example, an example in which the network device transmits a payload of the WLAN frame to the terminal device is mainly used for description. With reference to FIG. 14A, a PSDU of a WLAN frame includes an extension header (eheadr) and a payload. The payload includes a plurality of data code blocks, and each data code block includes a coding field (code word 0, code word 1, . . . ) and a check field (CRC). Generally, when valid data cannot fully occupy a length of the payload of the payload, a tail is usually supplemented in a padding manner. The extension header (eheadr) indicates one or more pieces of the following information: a length of the payload, a coding scheme and a modulation scheme of the coding field, and a type of the check field.

Figure 13A:
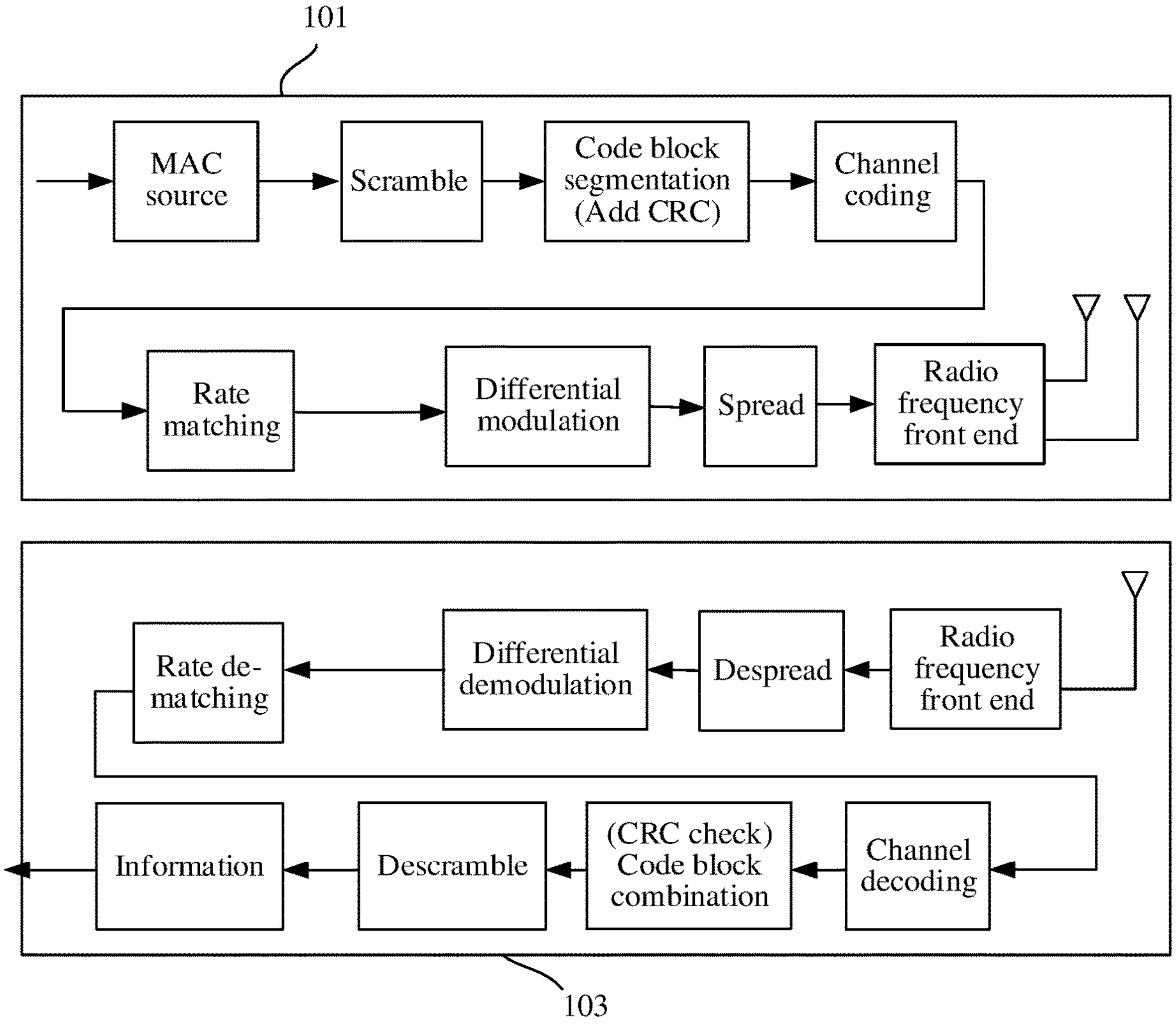
FIG. 13A is a schematic diagram of a transmission process between a sender and a recipient according to another embodiment.
Figure 13B:
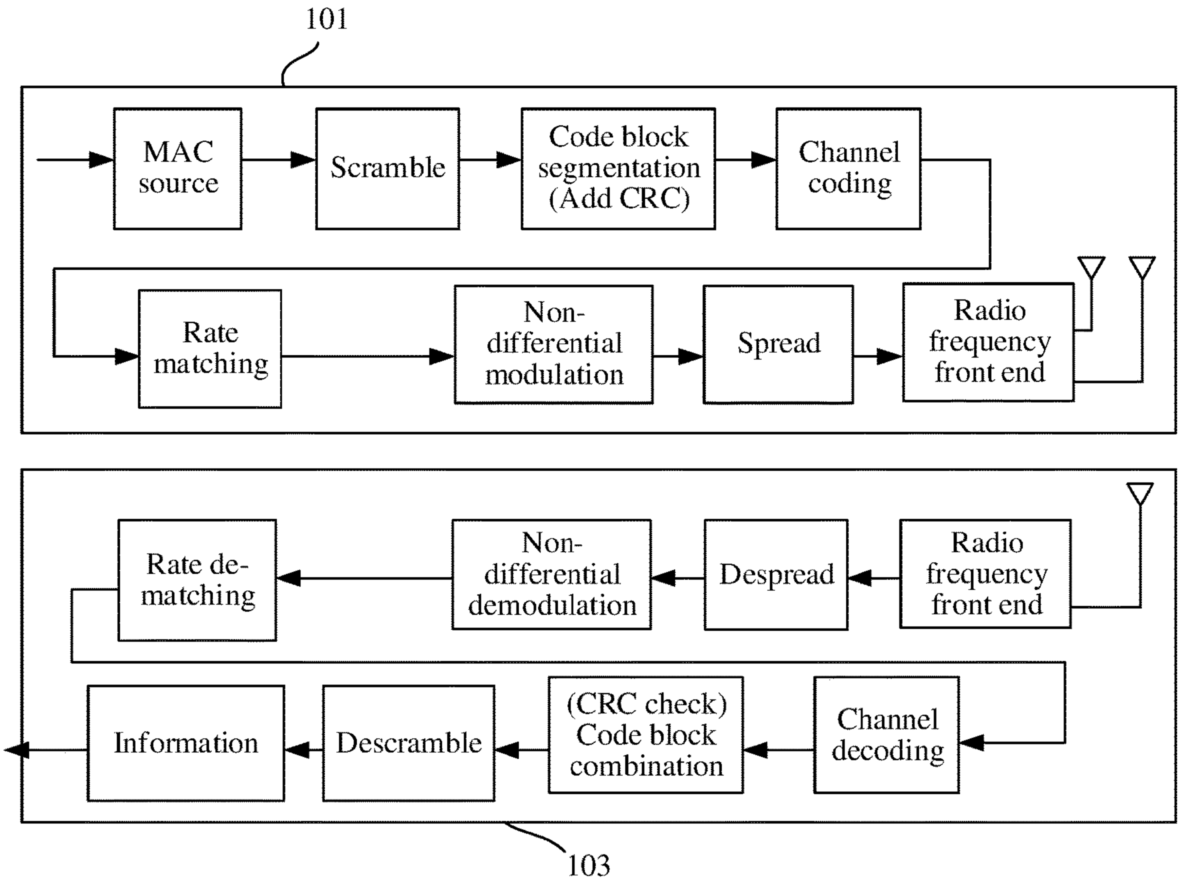
FIG. 13B is a schematic diagram of a transmission process between a sender and a recipient according to still another embodiment.
Figure 13C:
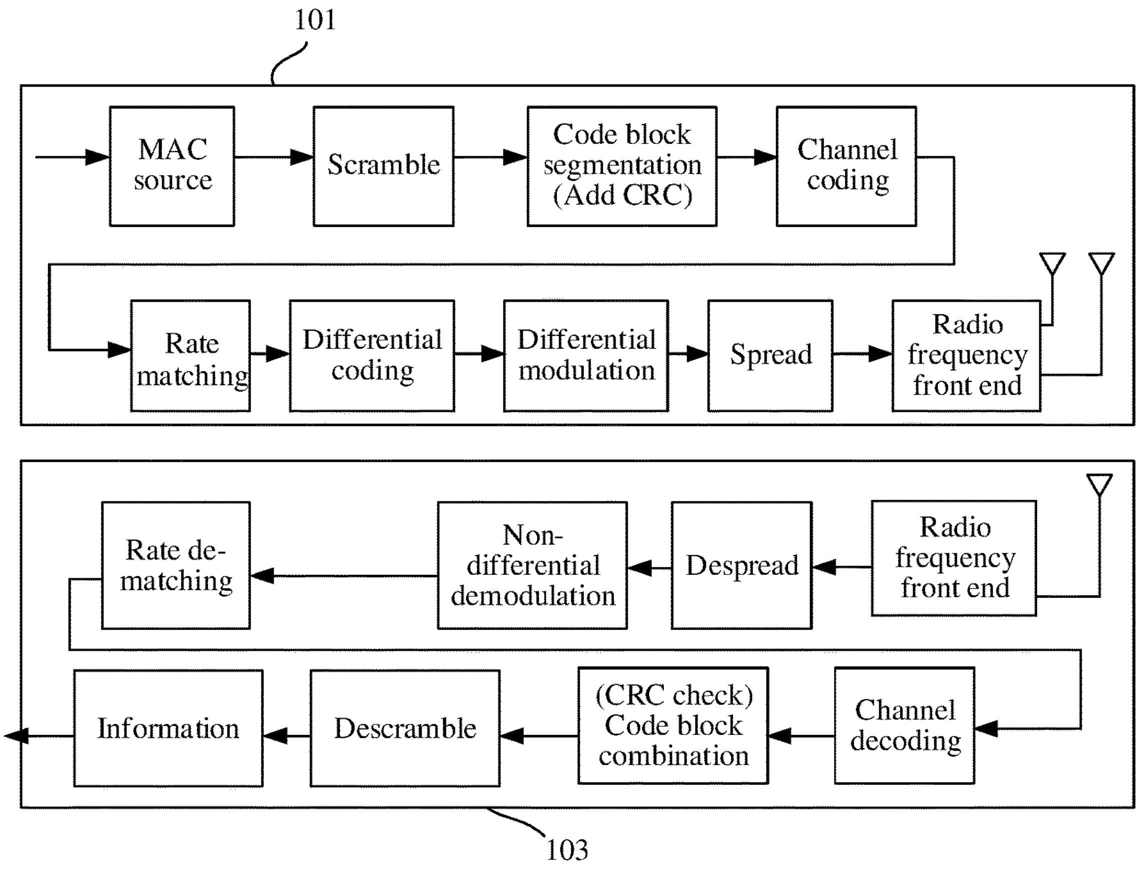
FIG. 13C is a schematic diagram of a transmission process between a sender and a recipient according to yet another embodiment.

Refer to FIG. 13A, FIG. 13B, and FIG. 13C, that a network device transmits a payload of a WLAN frame to a terminal device includes the following steps:

201. The network device performs channel coding on the data code blocks by using the coding scheme.

The data code blocks are mainly used to segment, based on a specific rule, scrambled information bits from a MAC source into coding fields that meet a coding rule, and add a check field (for example, a check field of cyclic redundancy check (CRC)) to each coding field obtained through segmentation, so that a recipient uses the check field to assist in decoding and check data. In step 201, the channel coding may specifically include PLCP coding, polar (Polar) coding, and the like. For example, polar coding may be performed on the data code blocks by using a coding rule of a polar (Polar) encoder.

202. The network device performs rate matching on data code blocks obtained through the channel coding.

Specifically, the data code obtained through the channel coding may be matched to a physical resource in a manner of duplication, puncturing, or truncation.

203. The network device performs differential coding on the data code blocks obtained through the rate matching.

204. The network device modulates the data code blocks after the differential coding based on the modulation scheme.

As shown in FIG. 13C, when the modulation scheme includes differential modulation, in step 203, the network device performs differential coding on the data code blocks obtained through the rate matching, to cooperate with the differential modulation in the subsequent step 204, so as to implement an effect of non-differential modulation, so that the recipient calculates a log likelihood ratio (LLR) by using non-differential demodulation. Certainly, as shown in FIG. 13A, when the modulation scheme includes differential modulation, the recipient may also directly use differential demodulation in step 207. When the modulation scheme in the subsequent step 204 includes non-differential modulation, for example, when complementary code keying (CCK) modulation is used, step 203 may be omitted, that is, a differential coding function may be used to directly transparently transmit the data code blocks obtained through the rate matching. In this way, refer to FIG. 13B, the recipient directly uses non-differential differential demodulation.

205. The network device transmits the data code blocks to the terminal device.

Specifically, in step 205, the data code blocks may be specifically transmitted by a radio frequency front end by using only an antenna after spreading.

206. The terminal device despreads the data code block based on a Barker code.

207. The terminal device demodulates the despread data code blocks based on the modulation scheme.

208. The terminal device performs de-differential decoding on the demodulated data code blocks.

Corresponding to inverse processes of the foregoing steps 203 and 204, in step 207 and step 208, when the modulation scheme uses differential modulation, LLR calculation of the received data code blocks is implemented by using a de-differential function and a demodulation function together. When the modulation scheme includes non-differential modulation, rate de-matching is directly performed on a result obtained after the data code blocks are demodulated.

209. The terminal device performs rate de-matching on the demodulated data code blocks.

For example, an input data length that meets a polar decoding requirement is generated through de-duplication, de-puncturing, or de-truncation.

210. The terminal device performs channel decoding on data code blocks obtained through the rate de-matching based on the coding scheme.

Polar decoding decodes an input LLR based on a specific decoding algorithm, to obtain the coding fields through decoding. Finally, the coding fields obtained through channel decoding are checked (for example, CRC check may be performed based on the check field CRC after each coding field), and code block combination is performed on several coding fields whose check results are correct, to restore the information bits of a transmitter.

In this way, channel coding is mainly introduced to a link of a transmitter for transmission of the payload of the WLAN frame, which is more conducive to improving transmission quality in a low SNR scenario.

Figure 14B:
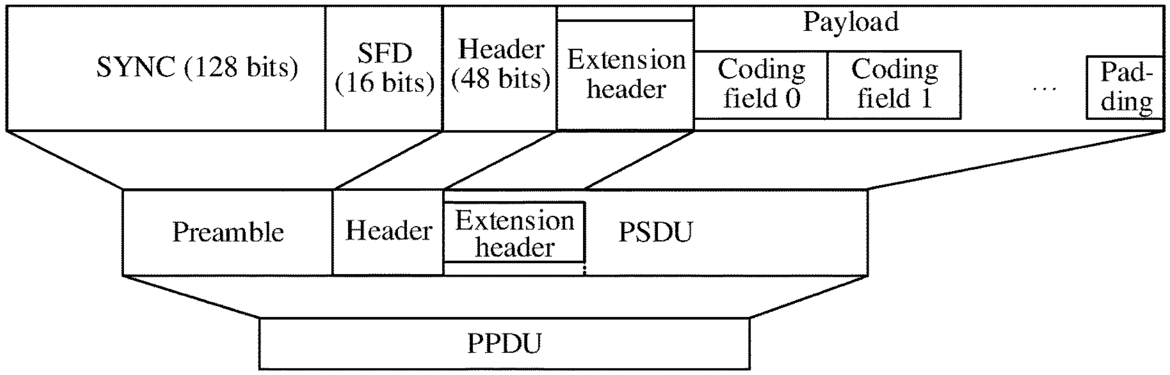
FIG. 14B is a schematic diagram of a structure of a WLAN frame according to still another embodiment.

In an example, the WLAN frame structure provided in this embodiment of this application may have both the preamble shown in FIG. 10 (that is, an enhanced preamble (epreamble) that includes at least one extension code provided in embodiments of this application) and a PSDU shown in FIG. 14A. That is, the payload part is sent in a channel coding manner. In this way, synchronization performance is improved, and transmission quality can also be improved in a low SNR scenario. Specifically, refer to FIG. 14A, a WLAN frame structure is provided, including an enhanced preamble (epreamble), a header (header, and referred to as a header for short), and a PLCP service data unit (PSDU). The PSDU includes an extension header eheader and a payload. The payload includes a plurality of data code blocks, and each data code block includes a coding field (code word 0, code word 1, . . . ) and a check field (CRC), where the check field CRC is used by a recipient to check a received coding field. It may be understood that the epreamble may be any of the preambles provided in FIG. 10, FIG. 11, and FIG. 12. In addition, it should be noted that, refer to FIG. 14B, each data code block may alternatively include only a coding field (code word 0, code word 1, . . . ), and the recipient directly checks transmitted data based on the coding field. Specifically, the eheader may include an elenghth field (12 bits), indicating a length of the payload; an eMOD field (2 bits), indicating a modulation scheme of the payload; a reserved field (reserved, 2 bits); and an eCRC field (8 bits), used to check the eheader.

Table 1 provides values of the parameters in the eheader.

TABLE 1

| Parameter | Value (value) |
|---|---|
| eLength | 0 to $2^{12-1}$, indicating a length of the payload, where eLength = Legacy LENGTH-eheader LENGTH, and the Legacy LENGTH is a payload length currently specified in the 802.11b protocol. Because the eheader uses polar coding (½ bit rate coding is used, and a code length of 24 bits after coding is 48 bits), the eheader LENGTH occupies 48 μs of the PSDU. |
| eMod | Payload modulation scheme indication:<br>0: 512 Kbps DBPSK<br>1: 1 Mbps DQPSK<br>2: 2.75 Mbps CCK55<br>3: 5.5 Mbps CCK11 |
| Reserved | A reserved bit |
| eCRC | 8 bits, used to check the eheader |

It should be noted that the service (SERVICE) field of the header in FIG. 4 is shown in Table 2.

TABLE 2

| b0 | b1 | b2 | b3 | b4 | b5 | b6 | b7 |
|---|---|---|---|---|---|---|---|
| Reserved (reserved) | Reserved | Locked clocks bit (locked clocks bit) | Mod. Selection Bit (modulation scheme selection) | Reserved | Reserved | Reserved | Length extension bit (length extension bit) |

Because the b3 field in Table 2 is not used in the 802.11b standard currently, the bit in the b3 field may be used to indicate whether the WLAN frame structure provided in this embodiment of this application is used. When the bit is configured as 0, it indicates a conventional 802.11b frame structure, and when the bit is configured as 1, it indicates the WLAN frame structure provided in this embodiment of this application.

In addition, the eheader is designed to send information such as a data length/modulation signaling by using the first 48 bits of the PSDU. Therefore, a polar coding field and a CRC check field that are smaller and formed by using a polar coding scheme may be used for sending, so as to adapt to operation in an extremely low SNR scenario.

Figure 15:
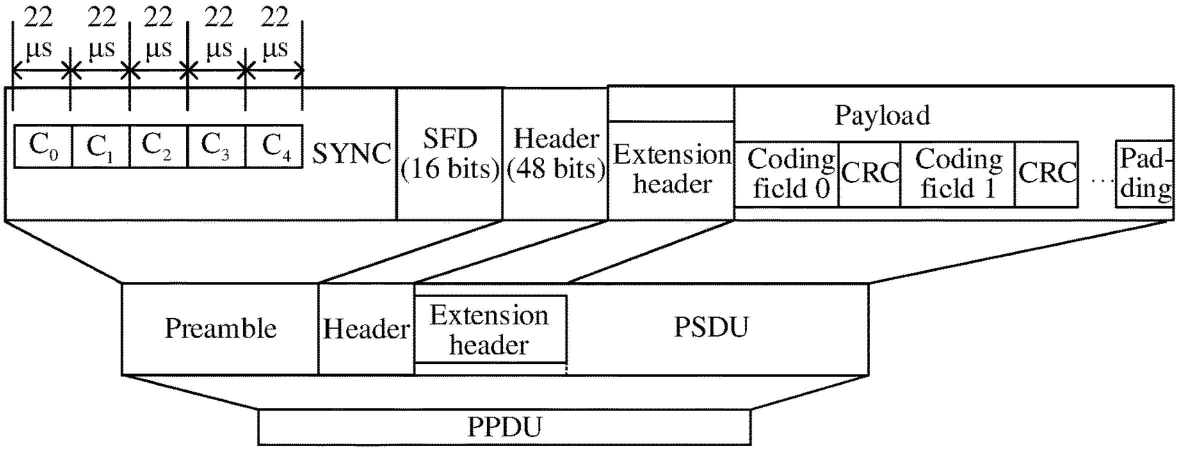
FIG. 15 is a schematic diagram of a structure of a WLAN frame according to yet another embodiment.
Figure 16:
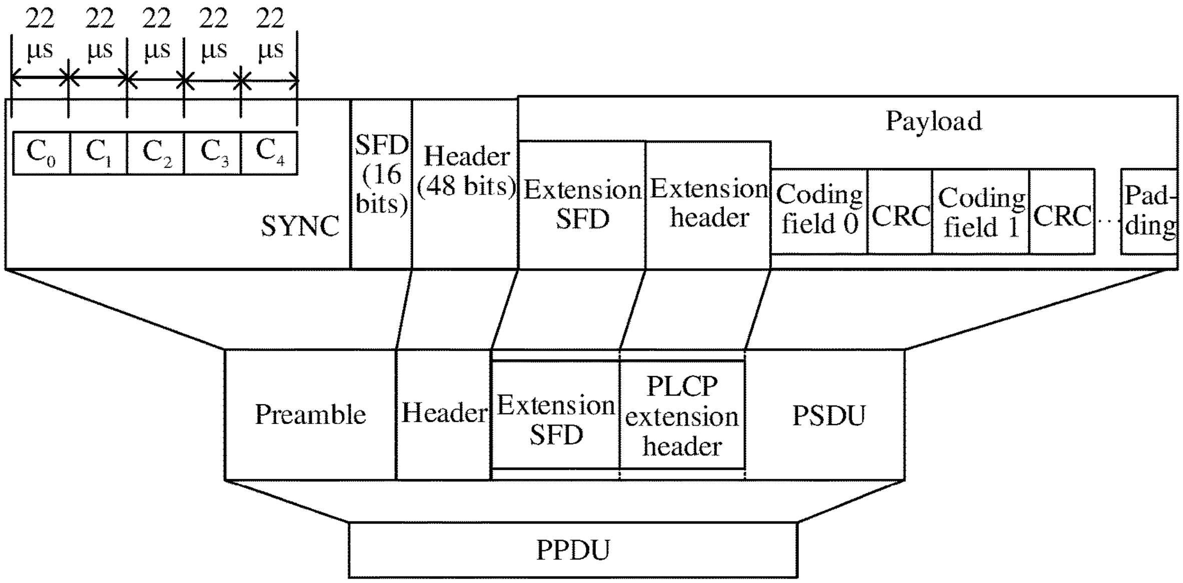
FIG. 16 is a schematic diagram of a structure of a WLAN frame according to another embodiment.

In an example, FIG. 16 provides a WLAN frame structure based on FIG. 15, and the PSDU further includes an extension start frame delimiter SFD (eSFD, 48 bits) located before the extension header eheader.

Specifically, the eheader may include an elenghth field (12 bits), indicating a length of the payload; an eMOD field (2 bits), indicating a modulation scheme of the payload; an eCoding field (1 bit), indicating a coding scheme used by the payload; a reserved field (reserved, 1 bit); and an eCRC field (8 bits), used to check the eheader.

Table 3 provides values of the parameters in the eheader.

TABLE 3

| Parameter | Value (value) |
|---|---|
| eLength | 0 to $2^{12-1}$, indicating a length of the payload, eLength = Legacy LENGTH-eSFD LENGTH - eheader LENGTH, and the Legacy LENGTH is a payload length currently specified in the 802.11b protocol. For example, the eheader uses polar coding (½ bit rate coding is used, and a code length of 24 bits after coding is 48 bits), and the eheader LENGTH occupies 48 μs of the PSDU; and the eSFD uses polar coding (½ bit rate coding is used, and a code length of 24 bits after coding is 48 bits), and the eSFD LENGTH occupies 48 μs of the PSDU. |
| eMod | Payload modulation scheme indication:<br>0: 512 Kbps DBPSK<br>1: 1 Mbps DQPSK<br>2: 2.75 Mbps CCK55<br>3: 5.5 Mbps CCK11 |
| eCoding | 0: polar<br>1: LDPC |
| Reserved | A reserved bit |
| eCRC | 8 bits, used to check the eheader |

The extension start frame delimiter SFD may include an eSFD sequence (16 bits) and eCRC (8 bits), which indicate that the eheader is sent subsequently. For example, a sequence in the eSFD is [1000110011101111], and the eCRC is [11000001].

It should be noted that, refer to FIG. 15 or FIG. 16, when five extension codes $C_0$ to $C_5$ are continuously inserted into a synchronization sequence of a WLAN frame, for example, α=2, a length of an extension code is 22 μs. Because a recipient mainly performs despreading based on a Barker code in an ACQ phase (that is, a synchronization sequence detection phase), and the extension code provided in this embodiment of this application is constructed based on the Barker code, a descrambling operation is not required. In addition, if a length of the five extension codes is 110 μs, remaining 18 μs symbols of the synchronization sequence are not replaced. Therefore, descrambling may be performed normally, and a descrambler is initialized to prepare for further parsing of the SFD. In addition, in this embodiment of this application, the b3 field of the service (SERVICE) field in the header may be used to indicate whether the WLAN frame structure provided in this embodiment of this application is used. Certainly, the foregoing eSFD and eheader in the MPDU (the MPDU is referred to as a PSDU after entering the PLCP layer) may also be used to indicate that the payload uses the WLAN frame structure provided in this embodiment of this application.

In addition, the eSFD is designed to be sent by using the first 48 bits of the PSDU. Therefore, the eSFD may be sent by using a polar coding field and a CRC check field that are smaller and formed by using a polar coding scheme, to adapt to operation in an extremely low SNR scenario.

For the terminal device serving as the recipient, in a SYNC phase (that is, a phase of receiving a synchronization sequence), a conventional WLAN frame is detected and the WLAN frame provided in this embodiment of this application is detected, that is, detection of an ACQ (that is, a current synchronization sequence)/SFD/header and detection of an eACQ (that is, a synchronization sequence including an extension code)/eSFD/eheader are simultaneously performed. In this case, when the conventional WLAN frame is successfully detected (that is, the ACQ/SFD/header are all successfully detected), if b3=0, data demodulation and decoding of the payload continue to be performed in a conventional manner, and detection of the WLAN frame provided in this embodiment of this application is stopped; or if b3=1, the frame is the WLAN frame provided in this embodiment of this application, detection of the WLAN frame provided in this embodiment of this application is stopped, and data demodulation and decoding of the payload are performed after waiting for 24 μs. In addition, detection of the conventional WLAN frame is stopped. If the WLAN frame provided in this embodiment of this application is successfully detected (the eACQ/eSFD/eheader are all successfully detected), data demodulation and decoding of the payload are performed in the manner provided in this embodiment of this application. In addition, when the eheader is successfully detected, detection of the conventional WLAN frame is immediately stopped. Although the data code blocks in the payloads in FIG. 15 and FIG. 16 are described by using an example in which each data code block includes a coding field and a check field, in some examples, the data code blocks in the payloads in FIG. 15 and FIG. 16 may alternatively be in the form shown in FIG. 14B, that is, include only the coding field.

It may be understood that, to implement the foregoing functions, the network device and the terminal device include corresponding hardware structures and/or software modules for performing the functions. A person skilled in the art should be easily aware that, in combination with units and algorithm operations of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the network device may be obtained through division based on the foregoing method example. For example, the functional modules may be obtained through division corresponding to various functions, or two or more functions may be integrated into one processing module. The integrated module may be implemented in a form of hardware, or may be implemented in a form of a software functional module. It should be noted that, in embodiments of this application, module division is an example, and is merely logical function division. In an actual implementation, another division manner may be used.

Figure 17:
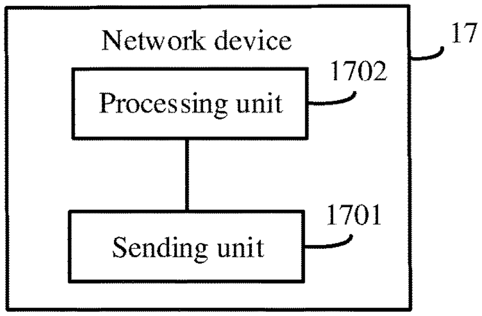
FIG. 17 is a schematic diagram of a structure of a network device according to an embodiment.

For example, in a case that each functional module is obtained through division in an integrated manner, FIG. 17 is a schematic diagram of a structure of a communication apparatus. The communication apparatus may be a chip or a system on chip in the foregoing network device, or may be another combined device or component that can implement a function of the foregoing network device. The communication apparatus may be configured to perform the function of the network device in the foregoing embodiments.

In a possible implementation, the communication apparatus shown in FIG. 17 includes a sending unit 1701 and a processing unit 1702. The processing unit 1702 is configured to generate a WLAN frame including a preamble, where a synchronization sequence of the preamble includes at least one extension code, and the extension code includes N symbols generated based on a Barker code, where $N=\alpha*M$, M is a chip length of the Barker code, and $\alpha$ is a positive integer. The sending unit 1701 is configured to transmit the WLAN frame.

In a possible implementation, the synchronization sequence includes: a first group of extension codes, where the first group of extension codes includes a first extension code and a second extension code that is located in first duration after the first extension code; and a second group of extension codes, where the second group of extension codes includes a third extension code and a fourth extension code that is located in second duration after the third extension code; and the second group of extension codes is located after the first group of extension codes, and the first duration is not equal to the second duration.

In a possible implementation, a PSDU of the WLAN frame includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; the processing unit 1702 is further configured to: perform channel coding on the data code blocks by using the coding scheme; perform rate matching on data code blocks obtained through the channel coding; and modulate data code blocks obtained through the rate matching based on the modulation scheme, where the modulation scheme includes differential modulation; and the sending unit 1701 is configured to spread the modulated data code blocks and then transmit modulated data code blocks obtained through spreading.

In a possible implementation, the processor is further configured to perform differential coding on the modulated data code blocks, where the modulation scheme includes non-differential modulation.

In a possible implementation, the extension header further includes a check bit.

In a possible implementation, the PSDU further includes an extension start frame delimiter SFD located before the extension header.

In a possible implementation, a spreading sequence c of the extension code meets the following formula: $c=s\otimes b$; and the extension code is $s=r\otimes b$, where b is the Barker code, and $r=[+1;-1]$.

In a possible implementation, the extension code is obtained from a spreading sequence generated by spreading an initial sequence based on the Barker code.

All related content of the operations in the foregoing method embodiments may be cited in function descriptions of the corresponding functional modules. Details are not described herein again.

In this embodiment, the communication apparatus is presented in a form that the functional modules are obtained through division in an integrated manner. The “module” herein may be an ASIC, a circuit, a processor that executes one or more software or firmware programs, a memory, an integrated logic circuit, and/or another component that can provide the foregoing functions. In a simple embodiment, a person skilled in the art may figure out that the communication apparatus may be in the form of the network device shown in FIG. 6.

For example, the processor 201 in FIG. 6 may invoke the computer-executable instructions stored in the memory 203, so that the communication apparatus performs the communication method for a WLAN system in the foregoing method embodiments.

For example, functions/implementation processes of the sending unit 1701 and the processing unit 1702 in FIG. 17 may be implemented by the processor 201 in FIG. 6 by invoking the computer-executable instructions stored in the memory 203. Alternatively, functions/implementation processes of the processing unit 1702 in FIG. 17 may be implemented by the processor 201 in FIG. 6 by invoking the computer-executable instructions stored in the memory 203, and functions/implementation processes of the sending unit 1701 in FIG. 17 may be implemented by the transmitter in the transceiver 203 in FIG. 6.

The communication apparatus provided in this embodiment may perform the foregoing communication method for a WLAN system. Therefore, for technical effects that can be achieved by the communication apparatus, refer to the foregoing method embodiments. Details are not described herein again.

In embodiments of this application, functional modules of the terminal device may be obtained through division based on the foregoing method example. For example, the functional modules may be obtained through division corresponding to various functions, or two or more functions may be integrated into one processing module. The integrated module may be implemented in a form of hardware, or may be implemented in a form of a software functional module. It should be noted that, in embodiments of this application, module division is an example, and is merely logical function division. In an actual implementation, another division manner may be used.

Figure 18:
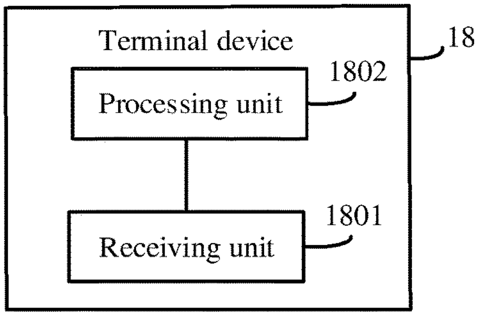
FIG. 18 is a schematic diagram of a structure of a terminal device according to an embodiment.

For example, in a case that each functional module is obtained through division in an integrated manner, FIG. 18 is a schematic diagram of a structure of a communication apparatus. The communication apparatus may be a chip or a system on chip in the foregoing terminal device, or may be another combined device or component that can implement a function of the foregoing terminal device. The communication apparatus may be configured to perform the function of the network device in the foregoing embodiments.

In a possible implementation, the communication apparatus shown in FIG. 18 includes a receiving unit 1801 and a processing unit 1802. The receiving unit 1801 is configured to receive a WLAN frame; and the processing unit 1802 is configured to despread the WLAN frame based on a Barker code, to obtain a synchronization sequence in a preamble, where the synchronization sequence of the preamble of the WLAN frame includes at least one extension code, and the extension code includes N symbols generated based on the Barker code, where $N=\alpha*M$, M is a chip length of the Barker code, and $\alpha$ is a positive integer.

In a possible implementation, the synchronization sequence includes: a first group of extension codes, where the first group of extension codes includes a first extension code and a second extension code that is located in first duration after the first extension code; and a second group of extension codes, where the second group of extension codes includes a third extension code and a fourth extension code that is located in second duration after the third extension code; and the second group of extension codes is located after the first group of extension codes, and the first duration is not equal to the second duration.

In a possible implementation, a PSDU of the WLAN frame includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; and the processing unit 1802 is further configured to: despread the data code blocks based on the Barker code; demodulate the despread data code blocks based on the modulation scheme, where the modulation scheme includes differential modulation; perform rate de-matching on the demodulated data code blocks; and perform channel decoding on data code blocks obtained through the rate de-matching based on the coding scheme.

In a possible implementation, the processor is further configured to perform de-differential decoding on the despread data code block, where the modulation scheme includes non-differential modulation.

In a possible implementation, the extension header further includes a check bit.

In a possible implementation, the PSDU further includes an extension start frame delimiter SFD located before the extension header.

In a possible implementation, a spreading sequence c of the extension code meets the following formula: $c=s\otimes b$; and the extension code is $s=r\otimes b$, where b is the Barker code, and $r=[+1;-1]$.

In a possible implementation, the extension code is obtained from a spreading sequence generated by spreading an initial sequence based on the Barker code.

All related content of the operations in the foregoing method embodiments may be cited in function descriptions of the corresponding functional modules. Details are not described herein again.

In this embodiment, the communication apparatus is presented in a form that the functional modules are obtained through division in an integrated manner. The "module" herein may be an ASIC, a circuit, a processor that executes one or more software or firmware programs, a memory, an integrated logic circuit, and/or another component that can provide the foregoing functions. In a simple embodiment, a person skilled in the art may figure out that the communication apparatus may be in the form of the terminal device shown in FIG. 6.

For example, the processor 201 in FIG. 6 may invoke the computer-executable instructions stored in the memory 203, so that the communication apparatus performs the communication method for a WLAN system in the foregoing method embodiments.

For example, functions/implementation processes of the receiving unit 1801 and the processing unit 1802 in FIG. 18 may be implemented by the processor 201 in FIG. 6 by invoking the computer-executable instructions stored in the memory 203. Alternatively, functions/implementation processes of the processing unit 1802 in FIG. 18 may be implemented by the processor 201 in FIG. 2 by invoking the computer-executable instructions stored in the memory 203, and functions/implementation processes of the receiving unit 1801 in FIG. 18 may be implemented by the receiver in the transceiver 303 in FIG. 6.

Figure 19:
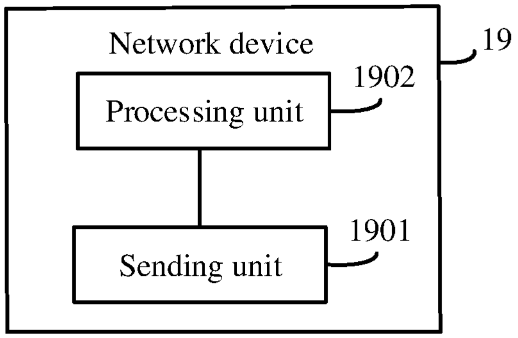
FIG. 19 is a schematic diagram of a structure of a network device according to another embodiment.

The communication apparatus provided in this embodiment may perform the foregoing communication method for a WLAN system. Therefore, for technical effects that can be achieved by the communication apparatus, refer to the foregoing method embodiments. Details are not described herein again. For example, in a case that each functional module is obtained through division in an integrated manner, FIG. 19 is a schematic diagram of a structure of a communication apparatus. The communication apparatus may be a chip or a system on chip in the foregoing network device, or may be another combined device or component that can implement a function of the foregoing network device. The communication apparatus may be configured to perform the function of the network device in the foregoing embodiments.

In a possible implementation, the communication apparatus shown in FIG. 19 includes a sending unit 1901 and a processing unit 1902. The processing unit 1902 is configured to: generate a WLAN frame including a PSDU, where the PSDU includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; perform channel coding on the data code blocks by using the coding scheme; perform rate matching on data code blocks obtained through the channel coding; and modulate data code blocks obtained through the rate matching based on the modulation scheme, where the modulation scheme includes differential modulation. The sending unit 1901 is configured to transmit the WLAN frame.

In a possible implementation, the processing unit 1902 is further configured to perform differential coding on the data code blocks obtained through the rate matching, where the modulation scheme includes non-differential modulation.

In a possible implementation, the extension header further includes a check bit.

In a possible implementation, the PSDU further includes an extension start frame delimiter SFD located before the extension header.

All related content of the operations in the foregoing method embodiments may be cited in function descriptions of the corresponding functional modules. Details are not described herein again.

In this embodiment, the communication apparatus is presented in a form that the functional modules are obtained through division in an integrated manner. The "module" herein may be an ASIC, a circuit, a processor that executes one or more software or firmware programs, a memory, an integrated logic circuit, and/or another component that can provide the foregoing functions. In a simple embodiment, a person skilled in the art may figure out that the communication apparatus may be in the form of the network device shown in FIG. 6.

For example, the processor 201 in FIG. 6 may invoke the computer-executable instructions stored in the memory 203, so that the communication apparatus performs the communication method for a WLAN system in the foregoing method embodiments.

For example, functions/implementation processes of the sending unit 1901 and the processing unit 1902 in FIG. 19 may be implemented by the processor 201 in FIG. 6 by invoking the computer-executable instructions stored in the memory 203. Alternatively, functions/implementation processes of the processing unit 1902 in FIG. 19 may be implemented by the processor 201 in FIG. 6 by invoking the computer-executable instructions stored in the memory 203, and functions/implementation processes of the sending unit 1901 in FIG. 19 may be implemented by the transmitter in the transceiver 203 in FIG. 6.

The communication apparatus provided in this embodiment may perform the foregoing communication method for a WLAN system. Therefore, for technical effects that can be achieved by the communication apparatus, refer to the foregoing method embodiments. Details are not described herein again.

In embodiments of this application, functional modules of the terminal device may be obtained through division based on the foregoing method example. For example, the functional modules may be obtained through division corresponding to various functions, or two or more functions may be integrated into one processing module. The integrated module may be implemented in a form of hardware, or may be implemented in a form of a software functional module. It should be noted that, in embodiments of this application, module division is an example, and is merely logical function division. In an actual implementation, another division manner may be used.

Figure 20:
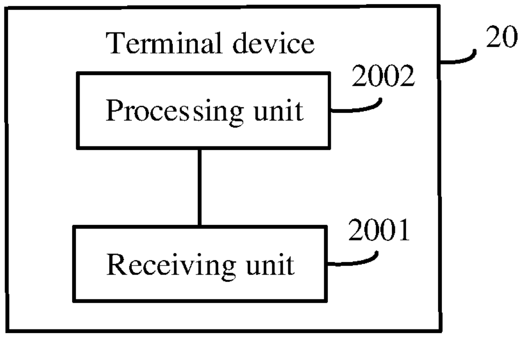
FIG. 20 is a schematic diagram of a structure of a terminal device according to another embodiment.

For example, in a case that each functional module is obtained through division in an integrated manner, FIG. 20 is a schematic diagram of a structure of a communication apparatus. The communication apparatus may be a chip or a system on chip in the foregoing terminal device, or may be another combined device or component that can implement a function of the foregoing terminal device. The communication apparatus may be configured to perform the function of the network device in the foregoing embodiments.

In a possible implementation, the communication apparatus shown in FIG. 20 includes a receiving unit 2001 and a processing unit 2002. The receiving unit 2001 is configured to receive a WLAN frame, where a PSDU of the WLAN frame includes an extension header and a payload, the payload includes a plurality of data code blocks, each data code block includes a coding field and a check field, and the extension header indicates one or more pieces of the following information: a length of the payload, a coding scheme and a modulation scheme of the coding field, and a type of the check field; and the processing unit 2002 is configured to: despread the data code blocks based on a Barker code; demodulate the despread data code blocks based on the modulation scheme, where the modulation scheme includes differential modulation; perform rate de-matching on the demodulated data code blocks; and perform channel decoding on data code blocks obtained through the rate de-matching based on the coding scheme.

In a possible implementation, the processing unit 2002 is further configured to perform de-differential decoding on the demodulated data code block, and the modulation scheme includes non-differential modulation.

In a possible implementation, the extension header further includes a check bit.

In a possible implementation, the PSDU further includes an extension start frame delimiter SFD located before the extension header. All related content of the operations in the foregoing method embodiments may be cited in function descriptions of the corresponding functional modules. Details are not described herein again.

In this embodiment, the communication apparatus is presented in a form that the functional modules are obtained through division in an integrated manner. The "module" herein may be an ASIC, a circuit, a processor that executes one or more software or firmware programs, a memory, an integrated logic circuit, and/or another component that can provide the foregoing functions. In a simple embodiment, a person skilled in the art may figure out that the communication apparatus may be in the form of the terminal device shown in FIG. 6.

For example, the processor 201 in FIG. 6 may invoke the computer-executable instructions stored in the memory 203, so that the communication apparatus performs the communication method for a WLAN system in the foregoing method embodiments.

For example, functions/implementation processes of the receiving unit 2001 and the processing unit 2002 in FIG. 20 may be implemented by the processor 201 in FIG. 6 by invoking the computer-executable instructions stored in the memory 203. Alternatively, functions/implementation processes of the processing unit 2002 in FIG. 20 may be implemented by the processor 201 in FIG. 2 by invoking the computer-executable instructions stored in the memory 203, and functions/implementation processes of the receiving unit 2001 in FIG. 20 may be implemented by the receiver in the transceiver 303 in FIG. 6.

The communication apparatus provided in this embodiment may perform the foregoing communication method for a WLAN system. Therefore, for technical effects that can be achieved by the communication apparatus, refer to the foregoing method embodiments. Details are not described herein again.

Optionally, an embodiment of this application further provides a communication apparatus (for example, the communication apparatus may be a chip or a chip system). The communication apparatus includes a processor and an interface, and the processor is configured to read instructions to perform the method in any one of the foregoing method embodiments. In a possible design, the communication apparatus further includes a memory. The memory is configured to store necessary program instructions and data. The processor may invoke program code stored in the memory, to indicate the communication apparatus to perform the method in any one of the foregoing method embodiments. Certainly, the communication apparatus may not include a memory. When the communication apparatus is a chip system, the communication device may include a chip, or may include a chip and another discrete component. This is not specifically limited in this embodiment of this application.

Specifically, when the second communication apparatus is a terminal device, and the first communication apparatus is a network device, the sending unit 1702 and the sending unit 1902 may be transmitters when transmitting information, the receiving unit 1802 and the receiving unit 2002 may be receivers when receiving information, and a transceiver unit may be a transceiver. The transceiver, the transmitter, or the receiver may be a radio frequency circuit. When the first communication apparatus and the second communication apparatus each include a storage unit, the storage unit is configured to store computer instructions. The processor is communicatively connected to the memory, and the processor executes the computer instructions stored in the memory, to cause the first communication apparatus and the second communication apparatus to perform the method in the method embodiments. The processor may be a general-purpose central processing unit (CPU), a microprocessor, or an application-specific integrated circuit (ASIC).

When the first communication apparatus and the second communication apparatus are chips, the sending unit 1702 and the receiving unit 1802 may be input and/or output interfaces, pins, circuits, or the like. The processing unit 1701 and the processing unit 1801 may execute computer-executable instructions stored in the storage unit, to cause a chip in the first communication apparatus and a chip in the second communication apparatus to perform the method in the method embodiments. Optionally, the storage unit is a storage unit in the chip, for example, a register or a cache. Alternatively, the storage unit may be a storage unit that is located in the terminal device or the network device and that is located outside the chip, for example, a read-only memory (ROM) or another type of static storage device that can store static information and instructions, or a random access memory (RAM).

All or some of the foregoing embodiments may be implemented by using software, hardware, firmware, or any combination thereof. When a software program is used to implement the foregoing embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid-state drive (SSD)). In embodiments of this application, the computer may include the apparatus described above.

Although this application is described with reference to the embodiments, in a process of implementing this application that claims protection, a person skilled in the art may understand and implement another variation of the disclosed embodiments by viewing the accompanying drawings, disclosed content, and appended claims. In the claims, the word "comprising" does not exclude another component or another step, and "a" or "one" does not exclude a plurality. A single processor or another unit may implement several functions listed in the claims. Some measures are recorded in dependent claims that are different from each other, but this does not mean that these measures cannot be combined to produce a better effect.

Although this application is described with reference to specific features and embodiments thereof, it is apparent that various modifications and combinations may be made to the specific features and embodiments without departing from the spirit and scope of this application. Correspondingly, this specification and the accompanying drawings are merely example descriptions of this application defined by the appended claims, and are considered as covering any or all of modifications, variations, combinations or equivalents within the scope of this application. It is apparent that a person skilled in the art can make various modifications and variations to this application without departing from the spirit and scope of this application. This application is intended to cover these modifications and variations provided that the modifications and variations to this application fall within the scope of the claims of this application and equivalent technologies thereof.

What is claimed is:

1. A communication method for a wireless local area network (WLAN) system, the method comprising:

generating a WLAN frame comprising a preamble, wherein a synchronization sequence of the preamble comprises at least one extension code, the extension code comprising a plurality of symbols generated based on a Barker code, wherein a number of the plurality of symbols is a product of a chip length of the Barker code and a positive integer; and transmitting the WLAN frame.

2. The method according to claim 1, wherein the synchronization sequence comprises:

a first group of extension codes, the first group of extension codes comprising a first extension code and a second extension code that is located in a first duration after the first extension code; and a second group of extension codes, the second group of extension codes comprising a third extension code and a fourth extension code that is located in a second duration after the third extension code, wherein the second group of extension codes is located after the first group of extension codes, and wherein the first duration is not equal to the second duration.

3. The method according to claim 1, wherein a physical layer service data unit (PSDU) of the WLAN frame comprises an extension header and a payload, wherein the payload comprises a plurality of data code blocks, each respective data code block comprising a coding field and a check field, and wherein the extension header indicates at least one of: a length of the payload, a coding scheme and a modulation scheme of the coding field, or a type of the check field, the method further comprising, before transmitting the WLAN frame:

performing channel coding on the plurality of data code blocks by using the coding scheme;

performing rate matching on data code blocks obtained through the channel coding; and modulating data code blocks obtained through the rate matching based on the modulation scheme, wherein the modulation scheme comprises differential modulation, and wherein transmitting the WLAN frame comprises spreading the modulated data code blocks and transmitting the modulated data code blocks obtained through spreading.

4. The method according to claim 3, wherein before the modulating data code blocks obtained through the rate matching based on the modulation scheme, the method further comprises:

performing differential coding on the data code blocks obtained through the rate matching, wherein the modulation scheme comprises non-differential modulation.

5. The method according to claim 3, wherein the extension header further comprises a check bit.

6. The method according to claim 3, wherein the PSDU further comprises an extension start frame delimiter (SFD) located before the extension header.

7. The method according to claim 1, wherein a spreading sequence c of the extension code meets the following formula: $c=s\otimes b$; and the extension code is $s=r\otimes b$, wherein b is the Barker code, and $r=[+1;-1]$.

8. The method according to claim 1, wherein the extension code is obtained from a spreading sequence generated by spreading an initial sequence based on the Barker code.

9. A communication method for a wireless fidelity Wi-Fi WLAN system, the method comprising:

generating a WLAN frame comprising a physical layer service data unit (PSDU), wherein the PSDU comprises an extension header and a payload, the payload comprising a plurality of data code blocks, each respective data code block comprising a coding field and a check field, and the extension header indicating at least one of: a length of the payload, a coding scheme and a modulation scheme of the coding field, or a type of the check field;

performing channel coding on the data code blocks by using the coding scheme;

performing rate matching on data code blocks obtained through the channel coding;

modulating data code blocks obtained through the rate matching based on the modulation scheme, wherein the modulation scheme comprises differential modulation; and transmitting the modulated data code blocks.

10. The method according to claim 9, wherein before the modulating the data code blocks obtained through the rate matching based on the modulation scheme, the method further comprises:

performing differential coding on the data code blocks obtained through the rate matching, wherein the modulation scheme further comprises non-differential modulation.

11. The method according to claim 9, wherein the extension header further comprises a check bit.

12. The method according to claim 9, wherein the PSDU further comprises an extension start frame delimiter (SFD) located before the extension header.

13. A communication method for a wireless fidelity WLAN system, comprising:

receiving a WLAN frame, wherein a synchronization sequence of a preamble of the WLAN frame comprises at least one extension code, the extension code comprising a plurality of symbols generated based on a Barker code, wherein a number of the plurality of symbols is equal to a product of a chip length of the Barker code and a positive integer; and despreading the WLAN frame based on the Barker code to obtain the synchronization sequence in the preamble.

14. The method according to claim 13, wherein the synchronization sequence comprises:

a first group of extension codes, the first group of extension codes comprising a first extension code and a second extension code that is located in a first duration after the first extension code; and a second group of extension codes, the second group of extension codes comprising a third extension code and a fourth extension code that is located in a second duration after the third extension code, wherein the second group of extension codes is located after the first group of extension codes, and wherein the first duration is not equal to the second duration.

15. The method according to claim 13, wherein a physical layer service data unit (PSDU) of the WLAN frame comprises an extension header and a payload, wherein the payload comprises a plurality of data code blocks, each respective data code block comprising a coding field and a check field, and wherein the extension header indicates at least one of: a length of the payload, a coding scheme and a modulation scheme of the coding field, or a type of the check field; the method further comprising:

despreading the data code blocks based on the Barker code;

demodulating the despread data code blocks based on the modulation scheme, wherein the modulation scheme comprises differential modulation;

performing rate de-matching on the demodulated data code blocks; and performing channel decoding on data code blocks obtained through the rate de-matching based on the coding scheme.

16. The method according to claim 15, wherein before the performing rate de-matching on the demodulated data code blocks, the method further comprises:

performing de-differential decoding on the demodulated data code blocks, wherein the modulation scheme further comprises non-differential modulation.

17. The method according to claim 15, wherein the extension header further comprises a check bit.

18. The method according to claim 15, wherein the PSDU further comprises an extension start frame delimiter (SFD) located before the extension header.

19. The method according to claim 13, wherein a spreading sequence c of the extension code meets the following formula: $c=s\otimes b$, and wherein the extension code is $s=r\otimes b$, wherein b is the Barker code, and $r=[+1;-1]$.

20. The method according to claim 13, wherein the extension code is obtained from a spreading sequence generated by spreading an initial sequence based on the Barker code.

* * * * *